United States Patent
Kawai et al.

(10) Patent No.: US 10,035,505 B2
(45) Date of Patent: Jul. 31, 2018

(54) CONTROLLER FOR HYBRID VEHICLE

(71) Applicant: TOYOTA JIDOSHA KABUSHIKI KAISHA, Toyota-shi, Aichi-ken (JP)

(72) Inventors: Takashi Kawai, Gotemba (JP); Takuro Kumada, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/101,602

(22) PCT Filed: Dec. 9, 2014

(86) PCT No.: PCT/IB2014/002697
§ 371 (c)(1),
(2) Date: Jun. 3, 2016

(87) PCT Pub. No.: WO2015/087132
PCT Pub. Date: Jun. 18, 2015

(65) Prior Publication Data
US 2016/0304084 A1    Oct. 20, 2016

(30) Foreign Application Priority Data

Dec. 12, 2013    (JP) .................................. 2013-257188

(51) Int. Cl.
*B60W 10/06* (2006.01)
*B60W 10/08* (2006.01)
(Continued)

(52) U.S. Cl.
CPC ............. *B60W 20/17* (2016.01); *B60K 6/445* (2013.01); *B60K 6/50* (2013.01); *B60W 10/06* (2013.01);
(Continued)

(58) Field of Classification Search
CPC ...... B60W 10/08; B60W 20/15; B60W 20/17; B60W 30/20; B60W 2030/206; B60W 2710/08; B60W 2710/0833
See application file for complete search history.

(56) References Cited

U.S. PATENT DOCUMENTS

| | | | |
|---|---|---|---|
| 6,176,808 B1 * | 1/2001 | Brown | B60K 6/365 180/65.25 |
| 9,604,623 B2 * | 3/2017 | Ide | B60W 10/08 |

(Continued)

FOREIGN PATENT DOCUMENTS

| | | |
|---|---|---|
| JP | 2010-23790 | 2/2010 |
| JP | 2010-264796 | 11/2010 |

(Continued)

OTHER PUBLICATIONS

Oyama, JP2013189170 (EPO translaiton Jun. 7, 2017).*

*Primary Examiner* — Kevin P Mahne
(74) *Attorney, Agent, or Firm* — Finnegan, Henderson, Farabow, Garrett & Dunner, LLP

(57) ABSTRACT

A controller includes control means for controlling an electric motor such that a pulsation compensation torque corresponding to a pulsation component of a torque of an internal combustion engine, which appears in a drive shaft, is supplied to the drive shaft as a damping torque for suppressing vibrations of the hybrid vehicle, and determination means for determining whether a torque of the electric motor, excluding the pulsation compensation torque, is smaller than a predetermined value. When it is determined that the torque excluding the pulsation compensation torque is smaller than the predetermined value, the control means controls the electric motor such that the sum of the pulsation compensation torque and a pressing torque corresponding to the predetermined value is supplied to the drive shaft as the damping torque.

6 Claims, 20 Drawing Sheets

(51) Int. Cl.
*B60W 20/17* (2016.01)
*B60W 30/182* (2012.01)
*B60W 30/20* (2006.01)
*B60K 6/50* (2007.10)
*B60K 6/445* (2007.10)
*B60W 50/00* (2006.01)

(52) U.S. Cl.
CPC .......... *B60W 10/08* (2013.01); *B60W 30/182* (2013.01); *B60W 30/20* (2013.01); *B60W 2030/206* (2013.01); *B60W 2050/0024* (2013.01); *B60W 2510/0638* (2013.01); *B60W 2510/0657* (2013.01); *B60W 2710/083* (2013.01); *B60Y 2200/92* (2013.01); *B60Y 2300/205* (2013.01); *B60Y 2300/43* (2013.01); *B60Y 2300/60* (2013.01); *Y02T 10/52* (2013.01); *Y02T 10/6239* (2013.01); *Y02T 10/6286* (2013.01); *Y02T 10/84* (2013.01); *Y10S 903/93* (2013.01)

(56) References Cited

U.S. PATENT DOCUMENTS

| | | | | |
|---|---|---|---|---|
| 9,624,848 B2 * | 4/2017 | Takahashi | ................ | B60K 6/48 |
| 2002/0117339 A1 * | 8/2002 | Nakashima | .............. | B60K 6/48 |
| | | | | 180/65.25 |
| 2003/0029653 A1 * | 2/2003 | Fujikawa | ............... | B60K 6/365 |
| | | | | 180/65.25 |
| 2004/0142790 A1 * | 7/2004 | Tomura | ................. | B60K 6/445 |
| | | | | 477/2 |
| 2005/0038576 A1 * | 2/2005 | Hara | ....................... | B60K 6/48 |
| | | | | 701/22 |
| 2009/0308674 A1 * | 12/2009 | Bhattarai | ............. | B60W 10/06 |
| | | | | 180/65.265 |
| 2010/0185373 A1 * | 7/2010 | Herter | ................... | B60W 30/20 |
| | | | | 701/67 |
| 2010/0235027 A1 * | 9/2010 | Park | ................ | B60W 30/18009 |
| | | | | 701/22 |
| 2011/0213533 A1 * | 9/2011 | Ueoka | .................... | B60K 6/445 |
| | | | | 701/66 |
| 2012/0016549 A1 * | 1/2012 | Katsumata | ............... | B60K 6/46 |
| | | | | 701/22 |
| 2012/0081051 A1 * | 4/2012 | Kobayashi | ............... | B60K 6/48 |
| | | | | 318/400.23 |
| 2012/0239237 A1 * | 9/2012 | Hashimoto | ............ | B60K 6/365 |
| | | | | 701/22 |
| 2013/0231838 A1 * | 9/2013 | Shiozawa | ............... | B60L 3/102 |
| | | | | 701/70 |
| 2013/0296103 A1 * | 11/2013 | Dai | ....................... | B60W 10/08 |
| | | | | 477/5 |
| 2013/0307449 A1 * | 11/2013 | Kobayashi | ............... | B60K 6/48 |
| | | | | 318/400.02 |
| 2014/0121872 A1 * | 5/2014 | Oh | .......................... | B60K 6/48 |
| | | | | 701/22 |
| 2014/0172209 A1 * | 6/2014 | Ide | ....................... | B60W 10/08 |
| | | | | 701/22 |
| 2014/0183878 A1 * | 7/2014 | Minamiguchi | ....... | B60W 30/20 |
| | | | | 290/40 C |
| 2014/0188319 A1 * | 7/2014 | Ohno | ..................... | B60W 10/08 |
| | | | | 701/22 |
| 2014/0330469 A1 * | 11/2014 | Yoshida | ................ | B60W 10/06 |
| | | | | 701/22 |
| 2014/0378273 A1 * | 12/2014 | Gibson | ................. | B60W 20/00 |
| | | | | 477/5 |
| 2015/0006063 A1 * | 1/2015 | Takahashi | ................ | B60K 6/48 |
| | | | | 701/110 |
| 2015/0191089 A1 * | 7/2015 | Yamamoto | ................ | B60L 7/18 |
| | | | | 701/22 |
| 2015/0197234 A1 * | 7/2015 | Liang | ..................... | B60L 15/20 |
| | | | | 701/22 |
| 2015/0360694 A1 * | 12/2015 | Tunhag | ................. | B60W 10/04 |
| | | | | 701/99 |
| 2016/0090006 A1 * | 3/2016 | Yamazaki | ............... | B60L 15/2063 |
| | | | | 701/22 |
| 2016/0200324 A1 * | 7/2016 | Suzuki | .................. | B60L 3/0076 |
| | | | | 701/22 |
| 2016/0221446 A1 * | 8/2016 | Suzuki | .................... | B60L 15/20 |
| 2016/0375894 A1 * | 12/2016 | Kawai | .................... | B60K 6/445 |
| | | | | 701/22 |

FOREIGN PATENT DOCUMENTS

| | | | | |
|---|---|---|---|---|
| JP | 2013189170 A | * | 3/2012 | ............ B60W 10/08 |
| JP | 2012-148645 | | 8/2012 | |

* cited by examiner

CONTROLLER FOR HYBRID VEHICLE

CROSS-REFERENCE TO RELATED APPLICATIONS

This application is a national phase application of International Application No. PCT/IB2014/002697, filed Dec. 9, 2014, and claims the priority of Japanese Application No. 2013-257188, filed Dec. 12, 2013, the content of both of which is incorporated herein by reference.

BACKGROUND OF THE INVENTION

1. Field of the Invention

The invention relates to a technical field of a controller for a hybrid vehicle.

2. Description of Related Art

There is known that torque pulsation occurs in a crankshaft of an internal combustion engine. In a vehicle configuration in which the crankshaft is coupled to a drive shaft coupled to drive wheels, the torque pulsation is transmitted to the drive shaft, causing vibrations and noise (hereinafter, referred to as "vibration noise" where appropriate) of the vehicle. Japanese Patent Application Publication No. 2010-023790 (JP 2010-023790 A) describes that, in order to suppress such vibrations and noise, a pulsation component of torque is calculated, and a pulsation torque for cancelling this pulsation component is output from an electric motor.

In a technical field different from suppression of noise and vibrations due to torque pulsation, when no torque is applied to a gear coupled to a drive shaft in a vehicle configuration including a differential gear mechanism between an internal combustion engine and an electric motor, the gear is pressed by adding pressing torque, thus suppressing noise due to looseness (for example, a play, such as backlash) of the gear mechanism (see Japanese Patent Application Publication No. 2012-148645 (JP 2012-148645 A)).

There is also a technique for changing an operation line of an internal combustion engine between an operation line for suppressing vibration noise and an operation line for fuel economy on the basis of an operating state of the internal combustion engine (see Japanese Patent Application Publication No. 2010-264796 (JP 2010-264796 A)). JP 2010-264796 A also describes that torque for cancelling torque pulsation is output from an electric motor in the case where the operation line for fuel economy is used.

SUMMARY OF THE INVENTION

There is looseness in a power transmission path between the internal combustion engine and the drive shaft and in a power transmission path between the electric motor and the drive shaft, as described in JP 2012-148645 A. In the case where vibration noise of the vehicle is intended to be suppressed by cancelling torque pulsation of the drive shaft by using torque supplied from the electric motor, if looseness between the electric motor and the drive shaft is not filled, there is a possibility that pulsation torque that is supplied from the electric motor is absorbed by the looseness and is not transmitted to the drive shaft. In such a state, torque pulsation of the internal combustion engine can be calculationally cancelled, but actually it is not possible to sufficiently reduce torque pulsation of the drive shaft. That is, the existing technical ideas including those described in JP 2010-023790 A to JP 2010-264796 A have such technical inconvenience that it is not possible to sufficiently reduce vibration noise of the vehicle.

The invention provides a controller for a hybrid vehicle, which is able to reliably reduce vibration noise of a vehicle due to torque pulsation of an internal combustion engine.

Because torque pulsation of the internal combustion engine is in interlocking with an engine rotation of the internal combustion engine, when the torque of the electric motor is intended to be accurately controlled in response to the torque pulsation, relatively high controllability (that is, the response of torque) is required. Therefore, when a pulsation torque is supplied from the electric motor as a damping torque, a control mode having excellent controllability, such as pulse width modulation (PWM) control, is suitably used.

On the other hand, in the hybrid vehicle, for example, when controllability that is required of the electric motor is not so high, a control mode that is more simple than PWM control, such as overmodulation control and rectangular wave control, is suitably used. Rectangular wave control, different from PWM control, does not need to step up an inverter voltage by using a step-up converter, or the like, and the frequency of switching of the inverter is also low, so the rectangular wave control is excellent in terms of electric power consumption.

Particularly, the efficiency of the internal combustion engine is not influenced by the control mode of the electric motor; however, an energy efficiency as a whole hybrid vehicle (hereinafter, referred to as "energy efficiency of the hybrid vehicle" where appropriate) generally in consideration of a fuel consumption of the internal combustion engine and an electric power consumption of the electric motor is influenced by the control mode of the electric motor as well. That is, in order to suppress the fuel consumption of the internal combustion engine, when the electric power consumption of the electric motor increases, the energy efficiency of the hybrid vehicle may deteriorate on the contrary. However, the technical idea for reducing vibration noise due to torque pulsation by focusing on such an energy efficiency of the hybrid vehicle is not present so far.

Therefore, the invention sufficiently reduces vibration noise of a hybrid vehicle while desirably further taking into consideration the energy efficiency of the vehicle.

A first aspect of the invention provides a controller for a hybrid vehicle. The hybrid vehicle includes an internal combustion engine and an electric motor. The internal combustion engine is configured to input a torque to a drive shaft or output a torque from the drive shaft. The electric motor is configured to input a torque to the drive shaft or output a torque from the drive shaft. The controller includes: an electronic control unit configured to a) control the electric motor such that a pulsation compensation torque is supplied to the drive shaft as a damping torque for suppressing vibrations of the hybrid vehicle, the pulsation compensation torque being a torque corresponding to a pulsation component of an engine output torque of the internal combustion engine, the pulsation component of the engine output torque appearing in the drive shaft, b) determine whether a torque excluding the pulsation compensation torque of the electric motor is smaller than a predetermined value, and c) control the electric motor such that, when the torque excluding the pulsation compensation torque is smaller than the predetermined value, the sum of the pulsation compensation torque and a pressing torque corresponding to the predetermined value is supplied to the drive shaft as the damping torque.

With the controller according to the first aspect of the invention, when the pulsation compensation torque is supplied from the electric motor in the case where the torque of the electric motor, excluding the pulsation compensation torque, is smaller than the predetermined value, the pressing torque corresponding to the predetermined value is added to the pulsation compensation torque. That is, the value of the damping torque for the purpose of suppressing vibrations is the sum of the pulsation compensation torque and the pressing torque. As a result, the pulsation compensation torque is supplied to the drive shaft in a state where looseness formed between the electric motor and the drive shaft is filled accordingly by using the pressing torque.

Thus, with the controller according to the first aspect of the invention, torque pulsation of the drive shaft due to the torque pulsation of the crankshaft of the internal combustion engine is suitably cancelled by the pulsation compensation torque of the electric motor appropriate for the torque pulsation of the crankshaft, so it is possible to suppress vibrations of the hybrid vehicle and, desirably, further suppress noise that accompanies the vibrations.

The phrase "in the case where a torque of the electric motor, excluding the pulsation compensation torque, is smaller than a predetermined value" does not necessarily mean all in that case. That is, the phrase means to incorporate, for example, the case where a predetermined condition is satisfied in that case.

For example, the "case where a torque of the electric motor, excluding the pulsation compensation torque, is smaller than a predetermined value" can mean the case where the torque of the electric motor is zero or a minimum value of substantially zero as a suitable one mode. In this case, the pressing torque is applied in a state where no torque is applied between power transmitting members interposed between the electric motor and the drive shaft, so the effect of the pressing torque is large. However, the fact that the torque of the electric motor is zero or substantially zero means one mode of the case where the torque of the electric motor is smaller than a predetermined value, and does not necessarily mean that zero torque is defined by the predetermined value.

The "torque of the electric motor" in the invention includes not only a torque that is actually output at that timing but also a torque command value to the electric motor.

A second aspect of the invention provides a controller for a hybrid vehicle. The hybrid vehicle includes an internal combustion engine and an electric motor. The internal combustion engine is configured to input a torque to a drive shaft or output a torque from the drive shaft. The electric motor is configured to input a torque to the drive shaft or output a torque from the drive shaft. The controller includes: an electronic control unit configured to a) select one from a group at least including a fuel economy operation line, a vibration noise suppression operation line and an intermediate operation line as an operation line of the internal combustion engine, the operation line being prescribed by an engine output torque and an engine rotation speed, the fuel economy operation line being an operation line at which a fuel consumption rate of the internal combustion engine is the smallest, the vibration noise suppression operation line being an operation line of which an operation point in an equal power line is higher in rotation and lower in torque than an operation point of the fuel economy operation line in the equal power line, and the intermediate operation line being an operation line of which an operation point in the equal power line is higher in rotation and lower in torque than an operation point of the fuel economy operation line in the equal power line and is lower in rotation and higher in torque than an operation point of the vibration noise suppression operation line in the equal power line, b) control the electric motor such that a pulsation compensation torque is supplied to the drive shaft as a damping torque for suppressing vibrations of the hybrid vehicle, the pulsation compensation torque being a torque corresponding to a pulsation component of an engine output torque of the internal combustion engine, the pulsation component of the engine output torque appearing in the drive shaft, c) determine whether a torque excluding the pulsation compensation torque of the electric motor is smaller than a predetermined value, d) when it is determined that the torque excluding the pulsation compensation torque is smaller than the predetermined value, select one mode having a highest energy efficiency of the hybrid vehicle from among a plurality of modes including a first mode, a second mode and a third mode, the first mode being configured to use the fuel economy operation line and set the damping torque to the sum of the pulsation compensation torque and a pressing torque corresponding to the predetermined value, the second mode being configured to use the intermediate operation line and set the damping torque to only the pressing torque, the third mode being configured to use the vibration noise suppression operation line and set the damping torque to zero, and e) when it is determined that the torque excluding the pulsation compensation torque is smaller than the predetermined value, control the internal combustion engine and the electric motor on the basis of the selected one mode.

There is a hybrid vehicle in which, for example, an internal combustion engine, single or multiple rotary electric machines including the electric motor according to the invention as one mode, and a drive shaft are coupled by a differential mechanism, such as single or multiple planetary gear mechanisms, and a kind of continuously variable shift function can be implemented by utilizing a differential action of the differential mechanism. For example, in such a vehicle configuration, an operation point of the internal combustion engine, which is prescribed by an engine rotation speed and an engine output torque, may be freely controlled within the range of physical constraints of the internal combustion engine and the single or multiple rotary electric machines.

In the controller according to the second aspect of the invention, a fuel economy operation line, a vibration noise suppression operation line and an intermediate operation line are prepared as operation lines that are obtained by connecting the operation points. The fuel economy operation line can at least minimize a fuel consumption rate among these plurality of operation lines. The vibration noise suppression operation line does not require the damping torque in order to suppress torque pulsation. The intermediate operation line is set between these operation lines. First to third modes are prepared as a mode associated with suppression of vibration noise of the hybrid vehicle.

A thermal efficiency of the internal combustion engine in the case where an engine power of the internal combustion engine is constant is the highest at an operation point of the fuel economy operation line, and decreases in order of an operation point of the intermediate operation line and an operating point of the vibration noise suppression operation line. However, a degree of improvement in the thermal efficiency in the case where the fuel economy operation line is used is not uniform to a required power of the internal combustion engine. More specifically, the magnitude of an increase in the thermal efficiency in the case where the fuel economy operation line is used decreases on a lower rotation or lower torque side and on a higher rotation or higher torque side with respect to a power region close to a power value at which the thermal efficiency of the internal combustion engine is the highest.

On the other hand, in a power region in which the degree of improvement in the thermal efficiency is small, the magnitude of torque pulsation of the drive shaft is also relatively small. Thus, in this region, even when the first mode (that is, the fuel economy operation line is used, Damping torque=Pulsation compensation torque+Pressing torque) is not used, torque pulsation may be practically sufficiently suppressed in the second mode (that is, the intermediate operation line is used, Damping torque=Pressing torque) or the third mode (that is, the vibration noise suppression operation line is used, no damping torque).

As is already described, the first mode is mostly in the case where PWM control is required to control the pulsation compensation torque, so a step-up loss or a switching loss tends to increase. Thus, depending on the power region of the internal combustion engine, there is a possibility that an electric power loss in the case where the first mode is used exceeds the amount of reduction in fuel consumption amount, resulting from improvement in thermal efficiency, and the energy efficiency of the hybrid vehicle is reduced on the contrary by selecting the first mode.

With the controller according to the second aspect of the invention, the mode in which the energy efficiency of the hybrid vehicle is high is selected from among these plurality of modes and used. Thus, it is possible to suppress vibrations and noise of the hybrid vehicle due to torque pulsation while constantly keeping the energy efficiency of the hybrid vehicle as high as possible.

In the controller according to the second aspect of the invention, the electronic control unit may be configured to diagnose an abnormality of the electric motor, and may be configured to, when the electric motor is diagnosed as an abnormality, select one mode appropriate for the diagnosed result of the abnormality. For example, one mode that is selected in this case may be a mode that is implementable by the electric motor and the energy efficiency of the hybrid vehicle is maximum among the plurality of modes.

In this way, with a configuration that is able to diagnose the electric motor as a concept including whether the electric motor has an abnormality, detection of an abnormal portion and determination as to specific details, and the like, of the abnormality, it is possible to select the mode that can keep the highest efficiency from a realistic aspect in response to the diagnosed result of the abnormality. Thus, within the operation limit range of the electric motor, it is possible to suitably suppress vibration noise of the hybrid vehicle.

In the aspects of the invention, the predetermined value may be at least larger than or equal to a value of torque that is required to fill looseness in a torque transmission path between the electric motor and the drive shaft.

According to this aspect, the predetermined value is set to a value larger than or equal to a torque that is required to fill looseness. Thus, it is possible to reliably complete looseness filling by using the pressing torque, so it is possible to effectively utilize the pulsation compensation torque to suppress torque pulsation of the drive shaft.

The size of the looseness may be acquired experimentally, empirically or theoretically in advance when the physical configuration of a power transmission path between the electric motor and the drive shaft is determined.

Practically, in the case where the pressing torque for filling the looseness is excessively large, the acceleration of the vehicle can change. Thus, as a desired one aspect, the predetermined value may be determined in consideration of a change that is applied by the pressing torque to the acceleration of the vehicle. For example, in this case, the predetermined value may be set to a value that is larger than or equal to a torque required to fill the looseness and at which a change in the acceleration of the vehicle can fall within a predetermined value.

In the first aspect, the electronic control unit may be configured to adjust a gain of the pulsation compensation torque such that the pulsation compensation torque decreases as an engine rotation speed of the internal combustion engine increases. In the first aspect, the electronic control unit may be configured to adjust a gain of the pulsation compensation torque such that the pulsation compensation torque decreases as the engine output torque decreases.

The magnitude of torque pulsation that appears in the crankshaft of the internal combustion engine is influenced by the engine output torque and engine rotation speed of the internal combustion engine. That is, the torque pulsation decreases (increases) as the engine output torque decreases (increases), whereas the torque pulsation decreases (increases) as the engine rotation speed increases (decreases).

On the other hand, with the controller according to the first aspect of the invention, when the pulsation compensation torque is output, the pressing torque is also added as part of the damping torque. In terms of the point that the magnitude of the torque pulsation changes in response to an engine state, the degree of contribution of the pressing torque to suppressing the torque pulsation relatively increases as the engine output torque of the internal combustion engine decreases or as the engine rotation speed increases.

According to this aspect, the gain of the pulsation compensation torque is reduced as the engine output torque of the internal combustion engine decreases or as the engine rotation speed increases. Thus, electric power consumption of the electric motor is effectively suppressed, so it is possible to keep the energy efficiency of the hybrid vehicle as high as possible.

Such operation and another advantage of the invention are become apparent from embodiments that will be described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of Invention

Hereinafter, various embodiments of the invention will be described with reference to the accompanying drawings.

1: First Embodiment 1.1: Configuration of Embodiment

Figure 1:
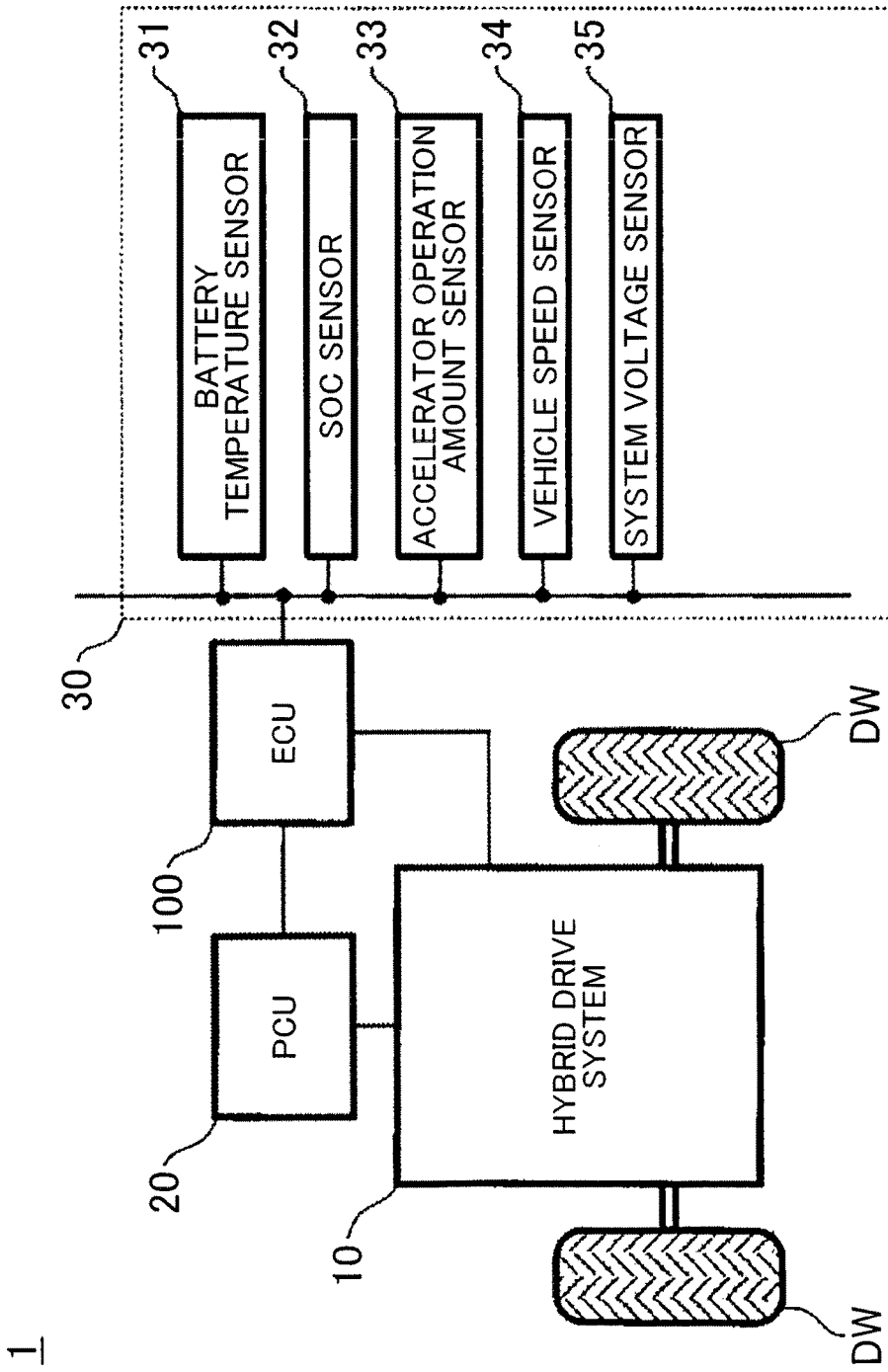
FIG. 1 is a schematic configuration view that conceptually shows the configuration of a hybrid vehicle according to a first embodiment of the invention.

Initially, the configuration of a hybrid vehicle 1 according to a first embodiment of the invention will be described with reference to FIG. 1. FIG. 1 is a schematic configuration view that conceptually shows the configuration of the hybrid vehicle 1.

As shown in FIG. 1, the hybrid vehicle 1 includes an electronic control unit (ECU) 100, a hybrid drive system 10, a power control unit (PCU) 20 and a sensor group 30, and is an example of a "hybrid vehicle" according to the invention.

The ECU 100 includes a CPU, a ROM, a RAM, and the like, and is an electronic control unit configured to be able to control operations of various portions of the hybrid vehicle 1. The ECU 100 is an example of a "controller for a hybrid vehicle" according to the invention. The ECU 100 is configured to be able to execute various controls (described later) by executing control programs stored in the ROM.

The PCU 20 is an electric power controller configured to convert direct-current power, taken out from a direct-current power supply B (described later), to alternating-current power and supply the alternating-current power to a motor generator MG1 (described later) and a motor generator MG2 (described later). The electric power controller is also configured to convert alternating-current power, acquired as a result of power generation of the motor generator MG1 and the motor generator MG2, to direct-current power and be able to charge the direct-current power supply B with the direct-current power. The detailed configuration of the PCU 20 will be described later with reference to FIG. 3.

The sensor group 30 is a collective term of various sensors that detect the states of the hybrid vehicle 1. As shown in FIG. 1, the sensor group 30 includes a battery temperature sensor 31, an SOC sensor 32, an accelerator operation amount sensor 33, a vehicle speed sensor 34, a system voltage sensor 35 and a line voltage sensor 36.

The battery temperature sensor 31 is configured to be able to detect a battery temperature Tbat that is the temperature of the direct-current power supply B. The battery temperature sensor 31 is electrically connected to the ECU 100. The detected battery temperature Tbat is configured to be read by the ECU 100 as needed.

The SOC sensor 32 is configured to be able to detect an SOC that is the remaining level of charge of the direct-current power supply B. The SOC sensor 32 is electrically connected to the ECU 100. The detected SOC is configured to be read by the ECU 100 as needed.

The accelerator operation amount sensor 33 is configured to be able to detect an accelerator operation amount Ta that is the operation amount of an accelerator pedal. The accelerator operation amount sensor 33 is electrically connected to the ECU 100. The detected accelerator operation amount Ta is configured to be read by the ECU 100 as needed.

The vehicle speed sensor 34 detects the vehicle speed V of the hybrid vehicle 1. The vehicle speed sensor 34 is electrically connected to the ECU 100. The detected vehicle speed V is configured to be read by the ECU 100 as needed.

The system voltage sensor 35 is able to detect a system voltage VH that is the output voltage of a step-up converter 21 (described later). The system voltage sensor 35 is electrically connected to the ECU 100. The detected system voltage VH is configured to be read by the ECU 100 as needed.

The sensors illustrated in FIG. 1 are part of sensors that constitute the sensor group 30. The hybrid vehicle 1 includes known various sensors in addition to these sensors.

Figure 2:
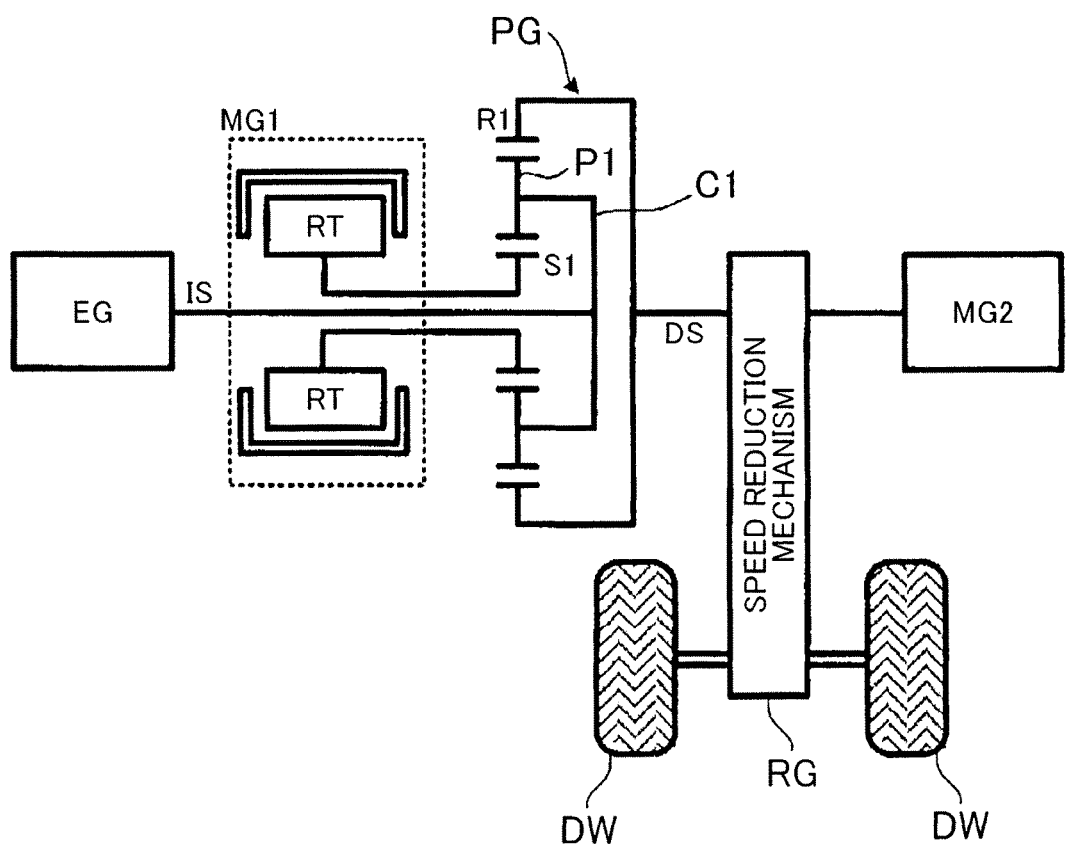
FIG. 2 is a schematic configuration view that conceptually shows the configuration of a hybrid drive system in the vehicle shown in FIG. 1.

The hybrid drive system 10 is a powertrain of the hybrid vehicle 1. The detailed configuration of the hybrid drive system 10 will be described with reference to FIG. 2. FIG. 2 is a schematic configuration view that conceptually shows the configuration of the hybrid drive system 10. In FIG. 2, like reference numerals denote portions that overlap with those of FIG. 1, and the description thereof is omitted where appropriate.

As shown in FIG. 2, the hybrid drive system 10 includes an engine EG, a power split mechanism PG, an input shaft IS, a drive shaft DS, the motor generator MG1 (hereinafter, simply referred to as "MG1" where appropriate), the motor generator MG2 (hereinafter, simply referred to as "MG2" where appropriate) and a speed reduction mechanism RG.

The engine EG functions as a main power source of the hybrid vehicle 1, and is a gasoline engine that is an example of an "internal combustion engine" according to the invention.

The engine EG includes a piston that reciprocally moves inside a cylinder in response to explosive power that is generated at the time when air-fuel mixture combusts in a combustion chamber formed inside the cylinder. In the engine EG, the reciprocal motion of the piston is converted to the rotational motion of a crankshaft via a connecting rod, and is extracted from the input shaft IS coupled to the crankshaft.

The detailed configuration of the engine EG is less relevant to the invention, so the description thereof is omitted. In the present embodiment, the engine EG is assumed as a gasoline engine. However, a practical mode of the "internal combustion engine" according to the invention includes a wide variety of engines. For example, the "internal combustion engine" according to the invention may be modified in fuel type, cylinder array, the number of cylinders, fuel supply mode, the configuration of a valve actuating system, the configuration of an intake/exhaust system, and the like.

The motor generator MG1 is a three-phase alternating-current motor generator having a powering function and a regenerating function. With the powering function, electric energy is converted to kinetic energy. With the regenerating function, kinetic energy is converted to electric energy.

The motor generator MG2 as well as the motor generator MG1 is a three-phase alternating-current motor generator. The motor generator MG2 as well as the motor generator MG1 has a powering function and a regenerating function. With the powering function, electric energy is converted to kinetic energy. With the regenerating function, kinetic energy is converted to electric energy. The motor generator MG2 is an example of an "electric motor" according to the invention.

The power split mechanism PG is a known planetary gear mechanism including a plurality of rotating elements that carry out differential action with one another. The power split mechanism PG includes a sun gear S1, a ring gear R1, a plurality of pinion gears (not shown) and a carrier C1. The sun gear S1 is provided at the center portion. The ring gear R1 is provided concentrically around the sun gear S1. The plurality of pinion gears are arranged between the sun gear S1 and the ring gear R1, and revolve around the sun gear S1 while rotating on their axes. The carrier C1 pivotally supports a rotary shaft of each pinion gear.

The sun gear S1 is a reaction element, and is fixed to the motor generator MG1. The reaction element takes charge of providing reaction torque for engine torque Te that is the output torque of the engine EG. Thus, the rotation speed of the sun gear S1 is equivalent to an MG1 rotation speed Nmg1 that is the rotation speed of the motor generator MG1.

The ring gear R1 is an output element of the power split mechanism PG, and is coupled to the drive shaft DS that is a power output shaft of the power split mechanism PG. The drive shaft DS is indirectly coupled to drive wheels DW of the hybrid vehicle 1 via the speed reduction mechanism RG including a differential, and the like.

The ring gear R1 is coupled to the motor generator MG2 via the drive shaft DS. Thus, an MG2 rotation speed Nmg2 is the rotation speed of the motor generator MG2, and uniquely correlates with the rotation speed Nd of the drive shaft DS and, by extension, the vehicle speed V.

The carrier C1 is coupled to the input shaft IS that is coupled to the crankshaft of the engine EG via a torsion damper. The rotation speed of the carrier C1 is equivalent to the engine rotation speed Ne of the engine EG.

With the above-described configuration, the power split mechanism PG is able to split power of the engine EG into two lines by distributing the engine torque Te between the sun gear S1 and the ring gear R1 by the carrier C1 at a predetermined ratio (a ratio based on a gear ratio among the gears). The engine torque Te is supplied from the engine EG to the input shaft IS.

At this time, for the sake of easy description of the operation of the power split mechanism PG, where a gear ratio ρ is defined as the ratio of the number of teeth of the sun gear S1 to the number of teeth of the ring gear R1, when the engine torque Te is applied from the engine EG to the carrier C1, a torque Tes that is applied to the sun gear S1 is expressed by the following mathematical expression (1), and a direct torque Tep that appears in the drive shaft DS is expressed by the following mathematical expression (2).

$$Tes = Te \times \rho/(1+\rho) \tag{1}$$

$$Tep = Te \times 1/(1+\rho) \tag{2}$$

Figure 3:
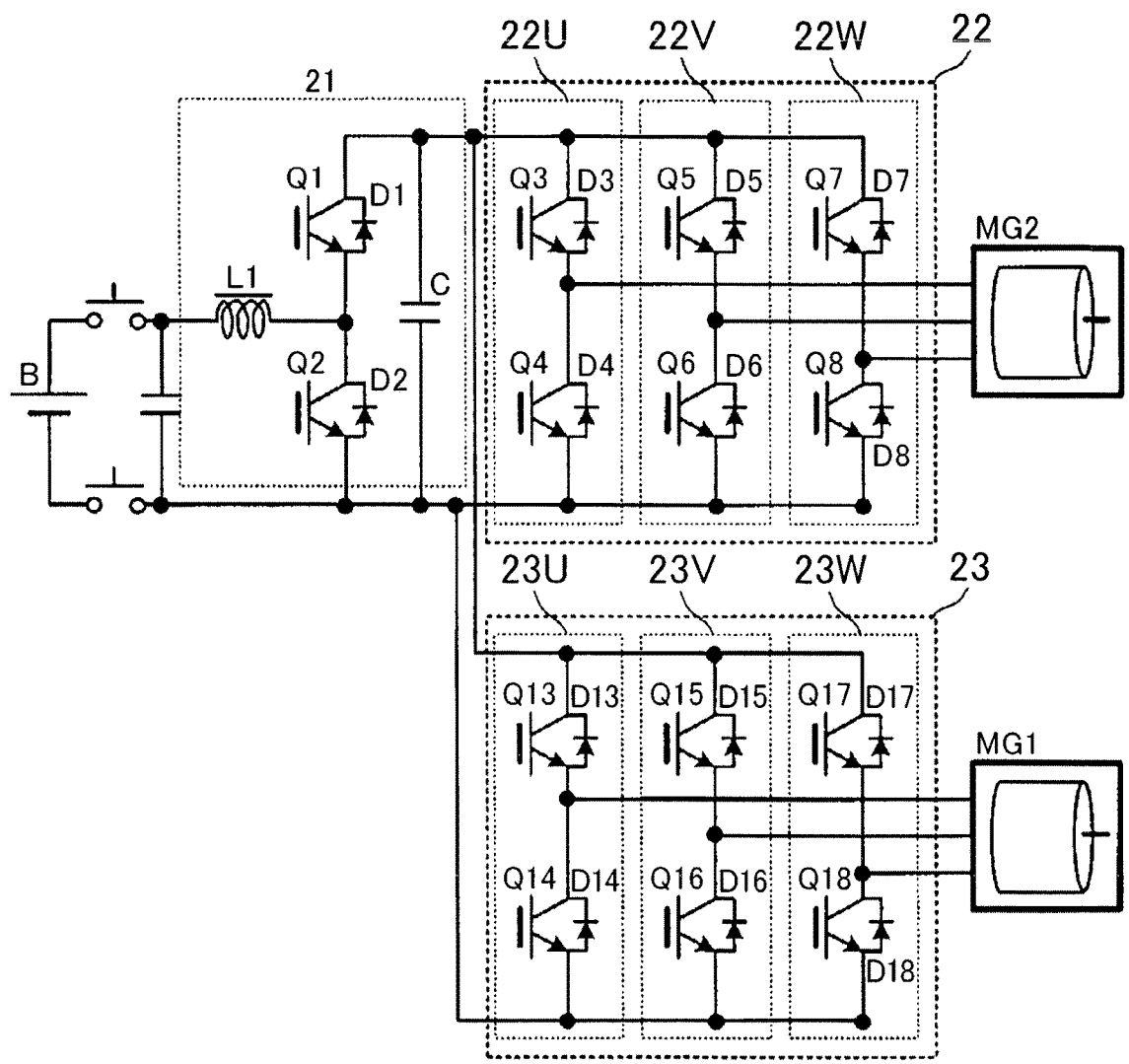
FIG. 3 is a circuit configuration view of a PCU in the vehicle shown in FIG. 1.

Next, the configuration of the PCU 20 will be described with reference to FIG. 3. FIG. 3 is a circuit configuration view of the PCU 20. In FIG. 3, like reference numerals denote portions that overlap with those of FIG. 2, and the description thereof is omitted as needed.

As shown in FIG. 3, the PCU 20 is an electric power controller including the step-up converter 21, an inverter 22 and an inverter 23. The electric power controller is configured to be able to control input and output of electric power between the direct-current power supply B and both the motor generators MG1, MG2.

The direct-current power supply B is, for example, a secondary battery unit having a power supply voltage VB (for example, 200 V). In the direct-current power supply B, a plurality of (for example, several hundreds of) various secondary battery cells (for example, a cell voltage V), such as nickel-metal hydride batteries and lithium-ion batteries, are connected in series. As the direct-current power supply B, instead of or in addition to a secondary battery of this type, an electric double-layer capacitor, a large-capacitance capacitor, a flywheel, or the like, may be used.

The step-up converter 21 is a step-up circuit including a reactor L1, switching elements Q1, Q2, diodes D1, D2 and a capacitor C.

In the step-up converter 21, one end of the reactor L1 is connected to a positive electrode line (reference sign is omitted) that is connected to the positive electrode of the direct-current power supply B, and the other end is connected to a midpoint between the switching element Q1 and the switching element Q2, that is, a connection point between an emitter terminal of the switching element Q1 and a collector terminal of the switching element Q2.

The switching elements Q1, Q2 are electrical switching elements connected in series between the positive electrode line and a negative electrode line (reference sign is omitted). The negative electrode line is connected to the negative electrode of the direct-current power supply B. The collector terminal of the switching element Q1 is connected to the positive electrode line. The emitter terminal of the switching element Q2 is connected to the negative electrode line. Each of the diodes D1, D2 is a rectifying element that allows only flow of current from the emitter side to the collector side in a corresponding one of the switching elements.

In the present embodiment, these switching elements are formed of a switching element Q1 and a switching element Q2, and constitute a double-arm step-up converter. The switching element Q1 is on a higher potential side than a connection point with an end of the reactor L1. Similarly, the switching element Q2 is on a lower potential side than the connection point with the end of the reactor L1. However, this configuration of the switching elements is an example, and the step-up converter may be a single-arm step-up converter including only the switching element Q2 in FIG. 3.

Each of the switching elements Q1, Q2 and switching elements (Q3 to Q8 and Q13 to Q18) of the inverters 22, 23 (described later) is formed as an insulated gate bipolar transistor (IGBT) equipped with a self-protection circuit. However, each of these switching elements may be formed of a power metal oxide semiconductor (MOS) transistor, or the like.

The capacitor C is connected between the positive electrode line and the negative electrode line. A terminal voltage of the capacitor C, that is, a potential difference VH between the positive electrode line and the negative electrode line, is the output voltage of the step-up converter 21. Hereinafter, the output voltage of the step-up converter 21 is expressed as the "system voltage VH" where appropriate.

The step-up converter 21 is configured so that an operating state of the step-up converter 21 is controlled through step-up control that is executed by the ECU 110. In step-up control, a signal PWC is generated and is output to the switching elements Q1, Q2 of the step-up converter 21. A logic state of the signal PWC changes in response to a magnitude relation between a carrier signal and a voltage command value. The carrier signal is a triangular wave. On the basis of the signal PWC, the step-up converter 21 is able to step up the voltage between the positive electrode line and the negative electrode line, that is, the system voltage VH, to the power supply voltage VB of the direct-current power supply B or higher. At this time, when the system voltage VH is lower than a target value, the on-duty of the switching element Q2 is set to be relatively large. Thus, it is possible to increase current flowing through the positive electrode line from the direct-current power supply B side toward the inverter side, so it is possible to increase the system voltage VH. On the other hand, when the system voltage VH is higher than the target value, the on-duty of the switching element Q1 is set to be relatively large. Thus, it is possible to increase current flowing through the positive electrode line from the inverter side to the direct-current power supply B side, so it is possible to reduce the system voltage VH.

The inverter 22 is an electric power converter for driving the motor generator MG2. The inverter 22 includes a U-phase arm 22U, a V-phase arm 22V and a W-phase arm 22W. The U-phase arm 22U includes the p-side switching element Q3 and the n-side switching element Q4. The V-phase arm 22V includes the p-side switching element Q5 and the n-side switching element Q6. The W-phase arm 22W includes the p-side switching element Q7 and the n-side switching element Q8. The arms of the inverter 22 are connected in parallel between the positive electrode line and the negative electrode line. For the sake of convenience of description, hereinafter, the p-side switching elements are referred to as "upper arms" where appropriate, and the n-side switching elements are referred to as "lower arms" where appropriate.

Rectifying diodes D3 to D8 are respectively connected to the switching elements Q3 to Q8 as well as the switching elements Q1, Q2 in the above-described step-up converter 21. The rectifying diodes D3 to D8 each pass current from the emitter side to the collector side. A connection point between the upper arm and lower arm of each phase in the inverter 22 is connected to a corresponding one of three-phase coils of the motor generator MG2.

The inverter 23 is an electric power converter for driving the motor generator MG1. The inverter 23 includes a U-phase arm 23U, a V-phase arm 23V and a W-phase arm 23W. The U-phase arm 23U includes the p-side switching element Q13 and the n-side switching element Q14. The V-phase arm 23V includes the p-side switching element Q15 and the n-side switching element Q16. The W-phase arm 23W includes the p-side switching element Q17 and the n-side switching element Q18. The arms of the inverter 23 are connected in parallel between the positive electrode line and the negative electrode line. For the sake of convenience of description, hereinafter, the p-side switching elements are referred to as "upper arms" where appropriate, and the n-side switching elements are referred to as "lower arms" where appropriate.

Rectifying diodes D13 to D18 are respectively connected to the switching elements Q13 to Q18 as well as the switching elements Q1, Q2 in the above-described step-up converter 21. The rectifying diodes D13 to D18 each pass current from the emitter side to the collector side. A connection point between the upper arm and lower arm of each phase in the inverter 23 is connected to a corresponding one of three-phase coils of the motor generator MG1.

1.2: Operation of Embodiment 1.2.1: Control Mode of Motor Generator

In the hybrid vehicle 1 according to the present embodiment, known PWM control and rectangular wave control are used for operation control over the motor generators MG1, MG2. The PWM control is current feedback control, and is control for supplying the motor generator with a PWM signal for each of the U phase, V phase and W phase by comparing a voltage command value with a carrier (carrier wave).

Specifically, in the PWM control, for each of the inverters corresponding to the respective motor generators, two-phase current command values (Idtg, Iqtg) are generated on the basis of a torque command value of the motor generator. On the other hand, three-phase current values based on a v-phase current Iv and a w-phase current Iw that are supplied as feedback information are converted to two-phase current values formed of a d-axis current Id and a q-axis current Iq. Two-phase voltage command values formed of a d-axis voltage Vd and a q-axis voltage Vq are generated on the basis of differences between the two-phase current command values (Idtg, Iqtg) and the two-phase current values Id, Iq. The generated two-phase voltage command values Vd, Vq are converted to three-phase voltage command values Vu, Vv, Vw.

When the three-phase voltage command values are obtained, a magnitude relation is compared between the converted three-phase voltage command values Vu, Vv, Vw and a carrier signal having a predetermined carrier frequency fcar. U-phase switching signals Gup, Gun, V-phase switching signals Gvp, Gvn and W-phase switching signals Gwp, Gwn are generated, and are supplied to the corresponding inverter. The logic states of the U-phase switching signals Gup, Gun, V-phase switching signals Gvp, Gvn and W-phase switching signals Gwp, Gwn change in response to the compared results.

Between the switching signals corresponding to each of the phases, the signal suffixed with the identifier "p" means a drive signal for driving the p-side switching element (Q3, Q5, Q7, Q13, Q15, Q17) that is the upper arm between the switching elements of each phase, and the signal suffixed with identifier "n" means a drive signal for driving the n-side switching element (Q4, Q6, Q8, Q14, Q16, Q18) that is the lower arm between the switching elements of each phase.

In comparison between the carrier signal and each phase voltage command value, when the phase voltage command value is brought into coincidence with the carrier signal from a value smaller than the carrier signal, the switching signal for turning on the p-side switching element is generated. When the phase voltage command value is brought into coincidence with the carrier signal from a value larger than the carrier signal, the switching signal for turning on the n-side switching element is generated. That is, the switching signals have inextricably linked on/off states. One of the p-side and n-side switching elements of each phase is constantly in an on state, and the other is constantly in an off state. When the inverter is changed into or kept in the driving states of the switching elements, which are prescribed by the switching signals of the respective phases, the motor generator is driven in accordance with a circuit state corresponding to the changed or kept driving states. PWM control is, for example, executed in this way.

On the other hand, the rectangular wave control is control for supplying a one-pulse switching signal to the motor generator in response to a motor electric angle, a voltage amplitude value is fixed to a maximum value, and torque is fed back through phase control.

In the rectangular wave control, a harmonic component larger than that in the PWM control is contained in the output current of the inverter. Therefore, the time constant of a digital low-pass filter is set to be larger than that of the PWM control. As a result, rectangular wave control is lower in control response than PWM control. On the other hand, a voltage utilization factor in rectangular wave control is larger than that in PWM control, so it is not required to step up the power supply voltage VB of the direct-current power supply B by the step-up converter 21. A switching loss of the inverter in rectangular wave control is also smaller than that in PWM control. Thus, rectangular wave control is higher in electric power consumption than PWM control.

A change of a control mode between a PWM control mode corresponding to PWM control and a rectangular wave control mode corresponding to rectangular wave control is, for example, carried out in response to a percentage modulation of the inverter. The percentage modulation is the ratio of an effective value J of a line voltage to the system voltage VH. The line voltage is an applied voltage of the motor generator. The effective value J of the line voltage may be, for example, obtained by the mathematical expression, such as "$J=(Vd^2+Vq^2)^{1/2}$" from the above-described d-axis command voltage Vd and q-axis command voltage Vq. Alternatively, the line voltage may be, for example, configured to be directly detected by a sensor, or the like, provided as part of the above-described sensor group 30.

A practical mode of change control based on the percentage modulation is not limited. For example, PWM control may be applied when the percentage modulation is lower than a predetermined value, whereas rectangular wave control may be applied when the percentage modulation is higher than or equal to the predetermined value. PWM control and rectangular wave control are illustrated here; however, known overmodulation control, or the like, may be further used as a manner of controlling the motor generator in addition to these controls. Requirements for changing the control mode are not limited to only the percentage modulation.

1.2.2: Control Over Operation Point of Engine EG

Figure 4:
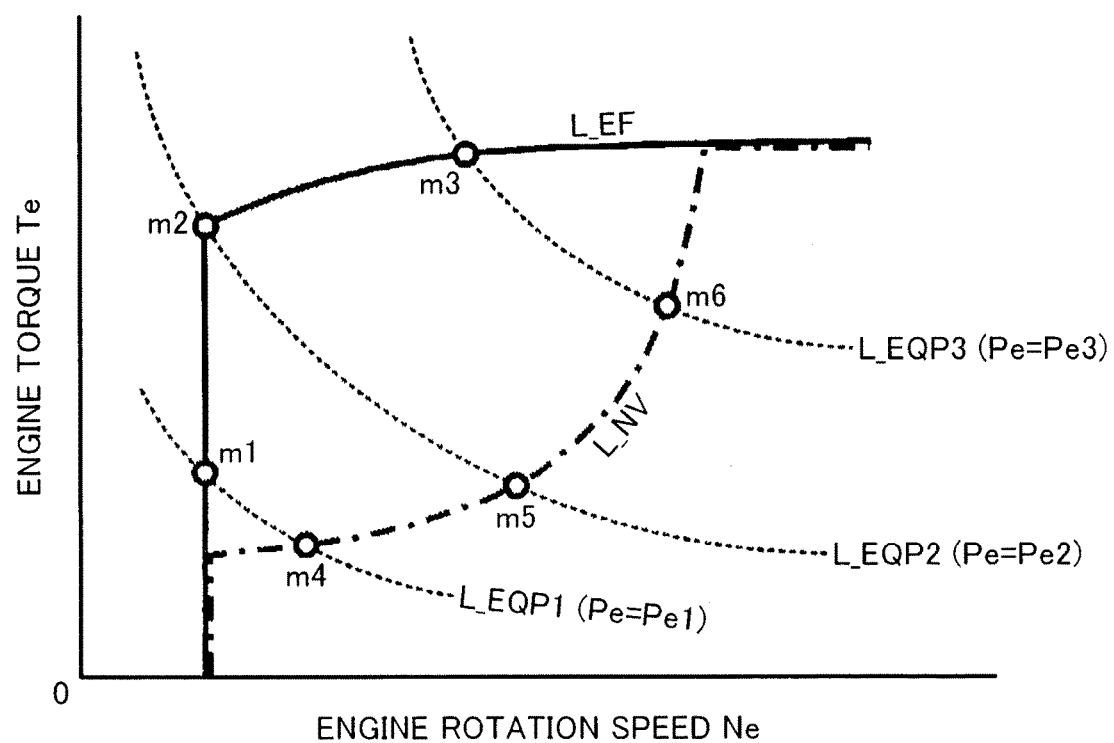
FIG. 4 is a conceptual view of engine operation lines for the vehicle shown in FIG. 1.

In the hybrid vehicle 1, it is possible to freely control the operation point of the engine EG (that is, an operation condition that is prescribed by the engine torque Te and the engine rotation speed Ne) owing to the differential action of the power split mechanism PG. The operation point is determined on various operation lines set in advance so as to match with a predetermined condition. The operation lines for the hybrid vehicle 1 will be described with reference to FIG. 4. FIG. 4 is a conceptual view of the operation lines of the engine EG.

In the present embodiment, the continuously variable shift function of this type is implemented by the power split mechanism PG that serves as a differential mechanism. However, the continuously variable shift function of this type may be implemented by intervening a mechanical continuously variable shift device, such as a continuously variable transmission (CVT), between the crankshaft of the engine EG and the drive shaft DS.

In FIG. 4, a two-dimensional coordinate plane in which the ordinate axis represents engine torque Te and the abscissa axis represents engine rotation speed Ne is illustrated. One ordinate point on the two-dimensional coordinate plane corresponds to one operation point of the engine EG. Hereinafter, the two-dimensional coordinate plane is referred to as "operation point plane" where appropriate.

On the operation point plane, an operation line that is obtained by connecting operation points, each of which satisfies the predetermined condition for each required output Pe of the engine EG may be defined. FIG. 4 illustrates a fuel economy operation line L_EF (see the continuous line) and a vibration noise suppression operation line L_NV (see the alternate long and short dashed line) as such an operation line.

The fuel economy operation line L_EF is obtained by connecting operation points at each of which the fuel consumption rate of the engine EG is the lowest (that is, the thermal efficiency is the highest) for the corresponding engine power Pe. In the operation point plane, equal power lines (see the dashed lines) at each of which the engine power Pe is equal are defined. FIG. 4 illustrates L_EQP1 corresponding to an engine power Pe1, L_EQP2 corresponding to an engine power Pe2 (Pe2>Pe1) and L_EQP3 corresponding to an engine power Pe3 (Pe3>Pe2) as the equal power lines. A target operation point of the engine EG is uniquely determined by the applied operation line and a required engine power Pen. That is, when the fuel economy operation line L_EF is selected, the operation point is an operation point m1 where the required engine power Pen is Pe1, the operation point is an operation point m2 where the required engine power Pen is Pe2, and the operation point is an operation point m3 where the required engine power Pen is Pe3.

On the other hand, the vibration noise suppression operation line L_NV is experimentally, empirically or theoretically determined in advance so that torque pulsation of the drive shaft DS does not come to the surface as an actual occupant's discomfort.

It is generally known that, when the crankshaft of the engine EG rotates, torque pulsation occurs in the crankshaft irrespective of whether there is an explosion in each cylinder of the engine EG. The torque pulsation is also transmitted to the drive shaft DS physically coupled to the crankshaft, and causes torque pulsation to occur in the drive shaft DS. When torque pulsation occurs in the drive shaft DS, vibrations or further accompanying noise (that is, vibration noise), which causes an occupant's discomfort, occurs in the hybrid vehicle 1.

The magnitude of vibration noise due to the torque pulsation correlates with pulsation torque that is generated in the crankshaft of the engine EG. That is, as pulsation torque increases, vibrations (or vibration noise) increase; whereas, as the pulsation frequency of pulsation torque decreases, vibrations (or vibration noise) increase.

Particularly, by comparing the fuel economy operation line L_EF with the vibration noise suppression operation line L_NV, operation points for the engine powers Pe in the vibration noise suppression operation line L_NV are constantly on a high-rotation low-torque side (see the operation points m4, m5, m6). That is, the vibration noise suppression operation line L_NV is more advantageous in suppressing vibration noise due to torque pulsation of the drive shaft DS than the fuel economy operation line L_EF. For example, the vibration noise suppression operation line L_NV is obtained by connecting operation points each of which is obtained by shifting an operation point to a high-rotation low-torque side until torque pulsation of the drive shaft DS falls within an allowable range. Thus, when the engine EG is operated at an operation point in the vibration noise suppression operation line L_NV, vibration noise of the hybrid vehicle 1 due to torque pulsation of the drive shaft DS falls within the allowable range.

However, when the vibration noise suppression operation line L_NV is used in terms of suppressing vibration noise, the fuel consumption rate of the engine EG deteriorates. Deterioration of the fuel consumption rate is not desirable for the hybrid vehicle 1 that stands for high economic performance. Therefore, in the hybrid vehicle 1, both suppression of vibration noise and suppression of deterioration of fuel consumption rate are achieved through vibration noise suppression control that is executed by the ECU 100.

1.2.3: Details of Vibration Noise Suppression Control

Figure 5:
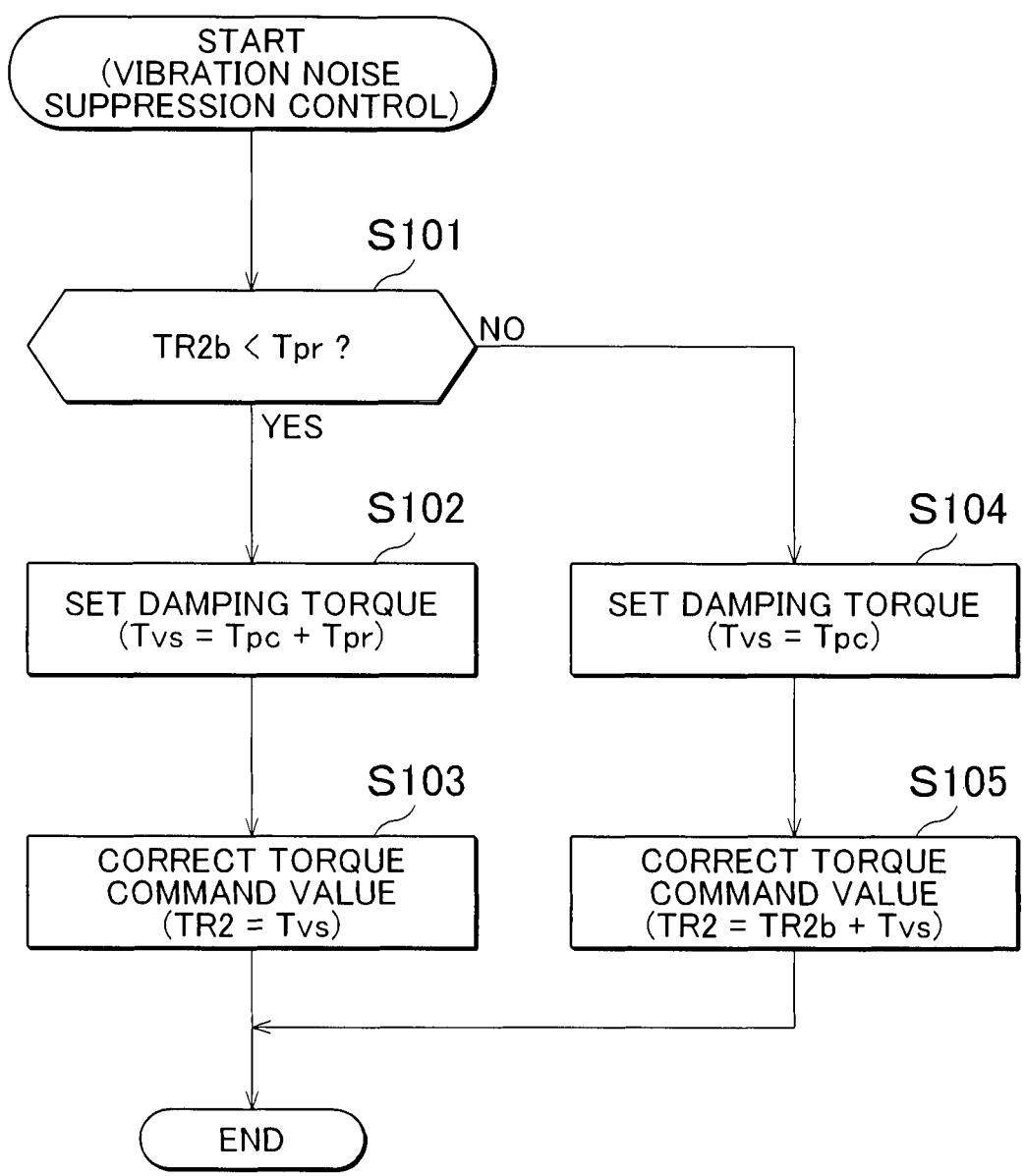
FIG. 5 is a flowchart of vibration noise suppression control according to the first embodiment.

Next, the details of vibration noise suppression control will be described with reference to FIG. 5. FIG. 5 is a flowchart of vibration noise suppression control.

As shown in FIG. 5, the ECU 100 acquires a reference torque command value TR2$b$ of the motor generator MG2, and determines whether the reference torque command value TR2$b$ is smaller than a pressing torque Tpr (accurately, smaller than a value of pressing torque Tpr) (step S101).

The reference torque command value TR2$b$ is a reference value of the torque command value TR2 of the motor generator MG2. The reference torque command value TR2$b$ is determined on the basis of a required power Pn of the hybrid vehicle 1, the required engine power Pen, the SOC of the direct-current power supply B, the input/output limit values (Win, Wout) of the direct-current power supply B, and the like. The input/output limit values (Win, Wout) of the direct-current power supply B change in response to the battery temperature Tb.

In other words, the reference torque command value TR2$b$ is a torque command value of the motor generator MG2 in the case where suppression of vibration noise is not taken into consideration. Known various modes are applicable to setting of the above reference torque command value TR2$b$.

Step S101 is an example of an operation of determination means for "determining whether a torque excluding a pulsation compensation torque of an electric motor is smaller than a predetermined value" according to the invention. As another example of step S101, it may be determined whether the reference torque command value TR2$b$ is zero, substantially zero or not.

The pressing torque Tpr will be described. The drive shaft DS and the motor generator MG2 are coupled to each other via various gears. Mutually meshing gear teeth are in mesh with each other via a physical clearance called looseness, including, for example, backlash, or the like. Transmission of torque between the drive shaft DS and the motor generator MG2 is not allowed until the looseness is filled. The pressing torque Tpr according to the present embodiment is a torque required to fill the looseness present between the drive shaft DS and the motor generator MG2.

If excessive torque is supplied in order to fill the looseness, redundant torque is transmitted to the drive shaft DS, so the drive shaft torque Tds that acts on the drive shaft DS increases in a looseness filling direction. As a result, there is a possibility that a change in acceleration or deceleration of the hybrid vehicle 1 makes an occupant feel discomfort. Thus, the pressing torque Tpr is set on the basis of the size of looseness and an operating condition of the hybrid vehicle 1 so that the looseness is filled and the change in acceleration or deceleration of the vehicle falls within a predetermined range. The size of the looseness is a fixed value that can be acquired in advance. The operating condition of the hybrid vehicle 1 includes, for example, the vehicle speed V, the MG2 rotation speed Nmg2 and/or the drive shaft torque Tds. Such a value of the pressing torque Tpr is experimentally, empirically or theoretically obtained in advance, and is described in a control map stored in the ROM.

When the value of torque required to fill the looseness is different from the value of torque at which a change in acceleration, large than or equal to the predetermined range, occurs in the vehicle, the pressing torque Tpr, strictly, has a certain range. In this case, the pressing torque Tpr that provides a reference for determination operation according to step S101 may be a lower limit value of this range. In this case, unless otherwise specified, the pressing torque Tpr indicates the lower limit value.

When the reference torque command value TR2$b$ is smaller than the pressing torque Tpr (YES in step S101), the ECU 100 sets a damping torque Tvs in accordance with the following mathematical expression (3) (step S102). The damping torque is a torque for suppressing vibrations and noise of the hybrid vehicle 1 due to torque pulsation of the drive shaft DS.

$$Tvs = Tpc + Tpr \qquad (3)$$

Tpc in the above mathematical expression (3) is a pulsation compensation torque, and is a pulsation torque for cancelling the pulsation torque of the drive shaft DS, caused by the pulsation torque that appears in the crankshaft of the engine EG. The pulsation compensation torque Tpc is, for example, a torque different in phase by 180 degrees from the pulsation torque of the drive shaft DS. Known various methods (for example, the method described in JP 2010-023790 A, and the like) are applicable as a method of calculating the pulsation torque that appears in the crankshaft of the engine EG. A value of the pulsation torque of the drive shaft DS, caused by the pulsation torque of the crankshaft, may be, for example, obtained by the above-described mathematical expression (2) that prescribes the correlation between the engine torque Te and the direct torque Tep. In this way, the damping torque Tvs is set to a torque corresponding to the sum of the pulsation compensation torque Tpc and the pressing torque Tpr when the reference torque command value TR2$b$ is smaller than the pressing torque Tpr.

When the damping torque Tvs is set to the sum of the pulsation compensation torque Tpc and the pressing torque Tpr, the ECU 100 corrects the torque command value TR2 of the motor generator MG2 (step S103). Specifically, the torque command value TR2 is set by the following mathematical expression (4).

$$TR2 = Tvs \quad (4)$$

That is, in this case, the damping torque Tvs (Tvs=Tpc+Tpr) is set as the torque command value TR2. When the reference torque command value TR2b is a value that is smaller than the pressing torque Tpr and that is not zero, the reference torque command value TR2b is discarded.

On the other hand, when the reference torque command value TR2b is larger than or equal to the pressing torque Tpr (NO in step S101), the ECU 100 sets the damping torque Tvs in accordance with the following mathematical expression (5) (step S104).

$$Tvs = Tpc \quad (5)$$

That is, in this case, the looseness formed between the motor generator MG2 and the drive shaft DS is filled by using the MG2 torque Tmg2 based on the reference torque command value TR2b, so it is not required to supply the pressing torque Tpr to the drive shaft DS. Thus, the damping torque Tvs is only the pulsation compensation torque Tpc.

When the damping torque Tvs is set in step S104, the torque command value TR2 is corrected on the basis of the set damping torque Tvs (step S105). Specifically, the torque command value TR2 is corrected in accordance with the following mathematical expression (6).

$$TR2 = TR2b + Tvs \quad (6)$$

In this way, when a torque larger than or equal to the pressing torque Tpr is estimated to be output from the motor generator MG2 because of the reference torque command value TR2b, the torque command value TR2 is corrected by adding the damping torque Tvs (Tvs=Tpc) to the reference torque command value TR2b.

When the torque command value TR2 is corrected in step S103 or step S105, vibration noise suppression control ends.

The corrected torque command value TR2 is used in a routine for controlling the operation of the motor generator MG2, different from vibration noise suppression control, and the MG2 torque Tmg2 is controlled.

1.2.4: Advantageous Effect of Vibration Noise Suppression Control

Figure 6A:
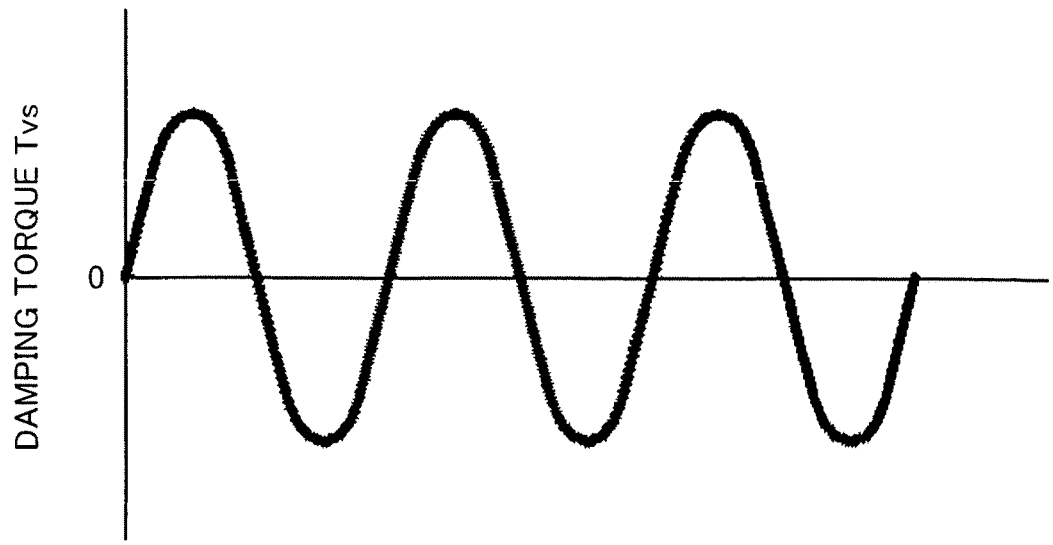
FIG. 6A and FIG. 6B are graphs that illustrate temporal changes in drive shaft torque in the case where vibration noise suppression control shown in FIG. 5 is not applied.
Figure 6B:
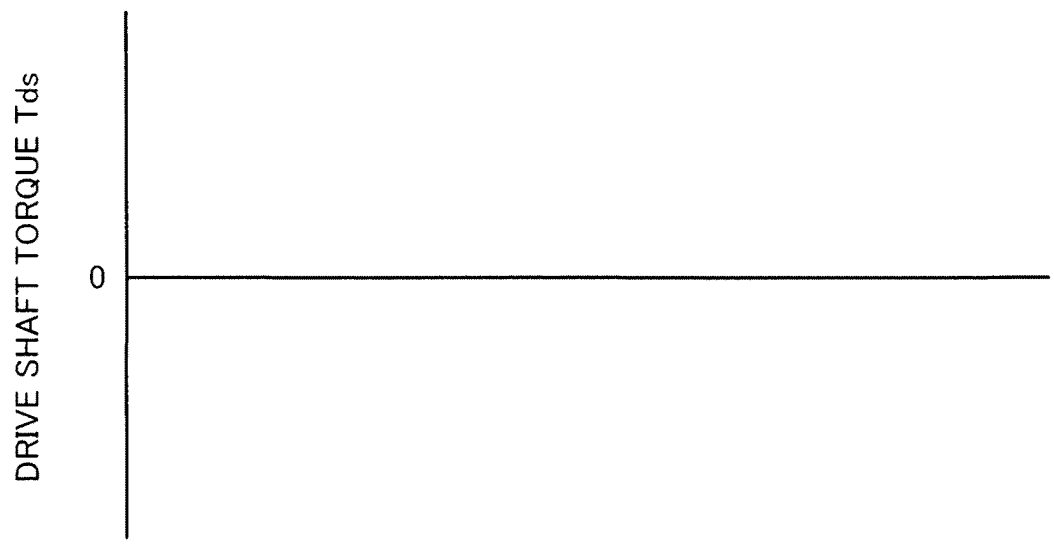
Figure 7A:
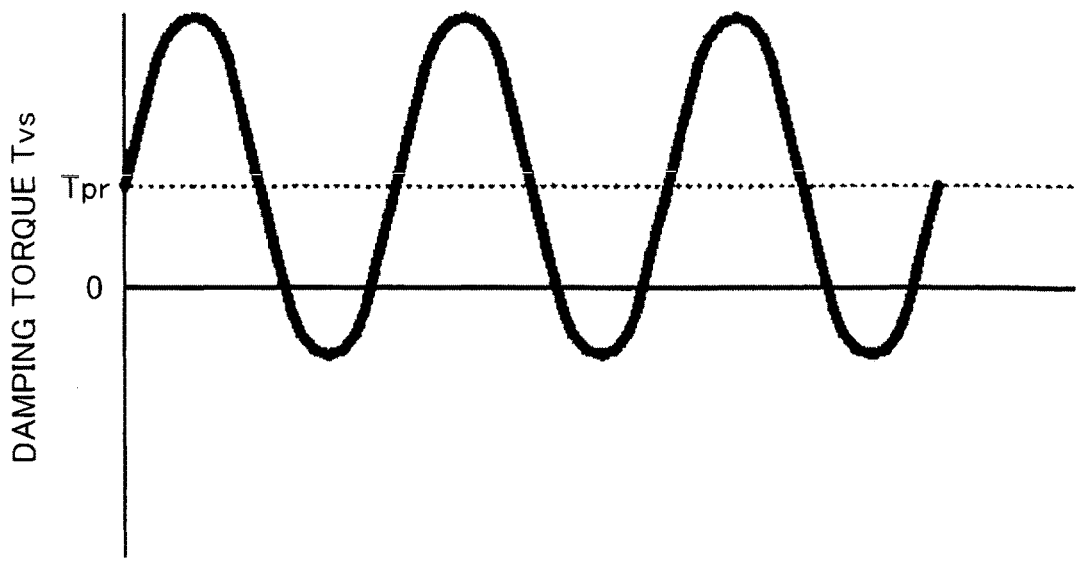
FIG. 7A and FIG. 7B are graphs that illustrate temporal changes in drive shaft torque in the case where vibration noise suppression control shown in FIG. 5 is applied.
Figure 7B:
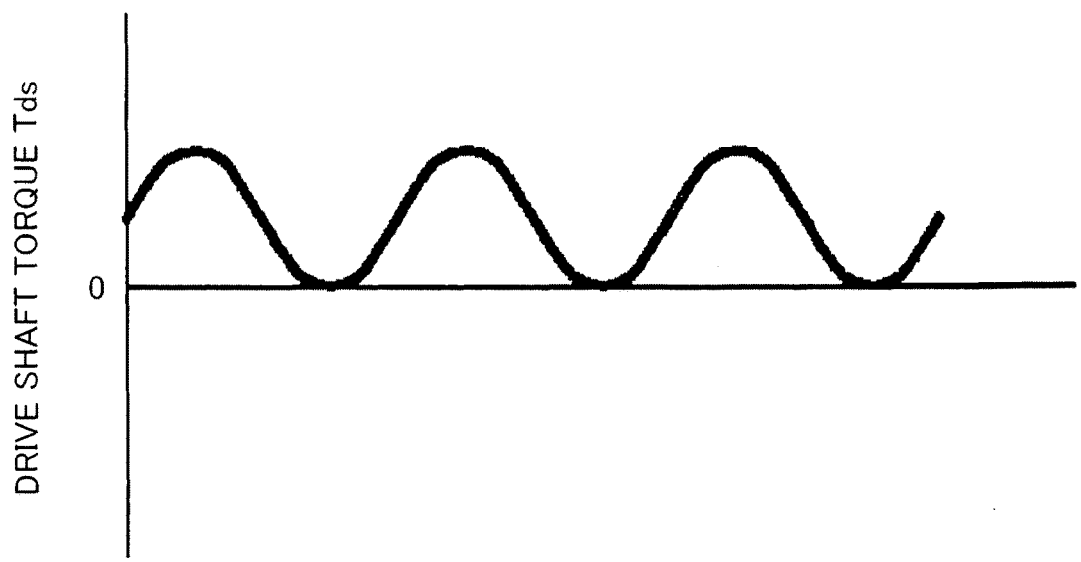

Next, the advantageous effect of vibration noise suppression control will be described with reference to FIG. 6A. FIG. 6B, FIG. 7A and FIG. 7B. FIG. 6A and FIG. 6B are graphs that illustrate a temporal change in the drive shaft torque Tds in the case where only the pulsation compensation torque Tpc is constantly supplied as the damping torque Tvs according to a comparative embodiment that should be subjected to comparison with vibration noise suppression control according to the present embodiment.

FIG. 6A illustrates a temporal change in the damping torque Tvs. FIG. 6B illustrates a temporal change in the drive shaft torque Tds. In the comparative embodiment, the damping torque Tvs is only the pulsation compensation torque Tpc (FIG. 6A).

As described above, there is looseness between the motor generator MG2 and the drive shaft DS, and the looseness is not filled when the MG2 torque Tmg2 is smaller than the pressing torque Tpr. In terms of the structure of the hybrid drive system 10, the motor generator MG2 rotates with rotation of the drive shaft DS; however, looseness is not filled in the meaning of contributing to transmission of torque in a situation that the motor generator MG2 is just co-rotated with the drive shaft DS.

In a state where looseness filling is not complete in this way, even when the pulsation compensation torque Tpc is supplied from the motor generator MG2, there is a possibility that the pulsation compensation torque Tpc is absorbed by the looseness and is not sufficiently transmitted to the drive shaft DS. FIG. 6B shows a state where the pulsation compensation torque Tpc is entirely absorbed by the looseness and does not appear in the drive shaft torque Tds at all as a remarkable example.

On the other hand, FIG. 7A and FIG. 7B are graphs that illustrate a temporal change in the drive shaft torque Tds when vibration noise suppression control according to the present embodiment is executed. In FIG. 7A and FIG. 7B, like reference signs denote portions that overlap with those in FIG. 6A and FIG. 6B, and the description thereof is omitted where appropriate.

When vibration noise suppression control according to the present embodiment is executed, the pulsation compensation torque Tpc is supplied to the drive shaft DS in a state where a torque larger than or equal to the pressing torque Tpr is definitely ensured (FIG. 7A). Therefore, the pulsation compensation torque Tpc is definitely transmitted to the drive shaft DS, and appears as a change in the drive shaft torque Tds (FIG. 7B).

In this way, with vibration noise suppression control according to the present embodiment, it is possible to reliably apply the pulsation compensation torque Tpc for suppressing torque pulsation of the drive shaft DS to the drive shaft DS. Thus, it is possible to reliably suppress torque pulsation of the drive shaft DS while suppressing deterioration of the fuel consumption rate by using the fuel economy operation line as the operation line of the engine EG.

2: Second Embodiment

2.1: Details of Vibration Noise Suppression Control

Figure 8:
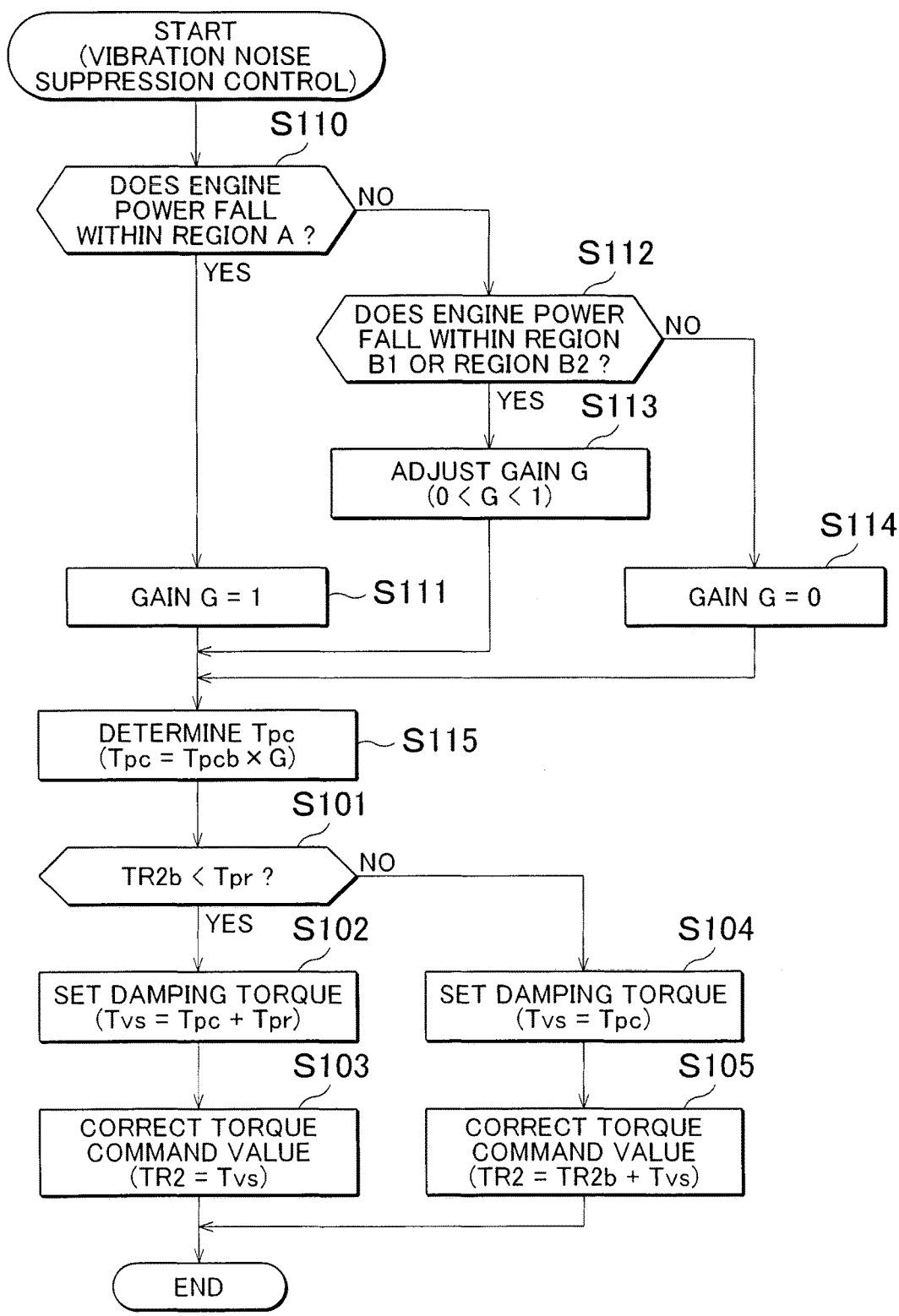
FIG. 8 is a flowchart of vibration noise suppression control according to a second embodiment.

Next, vibration noise suppression control according to a second embodiment of the invention, which is different from that of the first embodiment, will be described with reference to FIG. 8. FIG. 8 is a flowchart of vibration noise suppression control according to the second embodiment. In FIG. 8, like reference signs denote portions that overlap with those of FIG. 5, and the description thereof is omitted. A vehicle configuration according to the second embodiment is the same as the hybrid vehicle 1 according to the first embodiment.

As shown in FIG. 8, the ECU 100 determines whether the engine power Pe falls within a preset region A (step S110). The region A will be described later.

When the engine power Pe falls within the region A (YES in step S110), the ECU 100 sets a gain G to "1" (step S111). The gain G will be described later.

When the engine power Pe does not fall within the region A (NO in step S110), the ECU 100 further determines whether the engine power Pe falls within a region B1 or a region B2 (step S112). The regions B1, B2 will be described later together with the above-described region A.

When the engine power Pe falls within the region B1 or the region B2 (YES in step S112), the ECU 100 adjusts the gain G within the range of 0<G<1 in response to the engine power Pe (step S113). On the other hand, when the engine power Pe does not fall within the region B1 or the region B2 (NO in step S112), the ECU 100 sets the gain G to "0" (step S114).

When the gain G is set in step S111, step S113 or step S114, the ECU 100 determines the pulsation compensation torque Tpc in accordance with the following mathematical expression (7) (step S115).

$$Tpc = Tpcb \times G \qquad (7)$$

In the above mathematical expression (7), Tpcb is a base pulsation compensation torque that is a base of the pulsation compensation torque Tpc. The gain G is a rate at which the base pulsation compensation torque Tpcb is reflected, and is set within the range of $0 \le G \le 1$. The base pulsation compensation torque Tpcb is equivalent to the pulsation compensation torque Tpc according to the first embodiment.

When the pulsation compensation torque Tpc is determined, the process proceeds to step S101, and, after that, a process equivalent to the vibration noise suppression control according to the first embodiment will be executed. The vibration noise suppression control according to the second embodiment is executed as follows.

Figure 9:
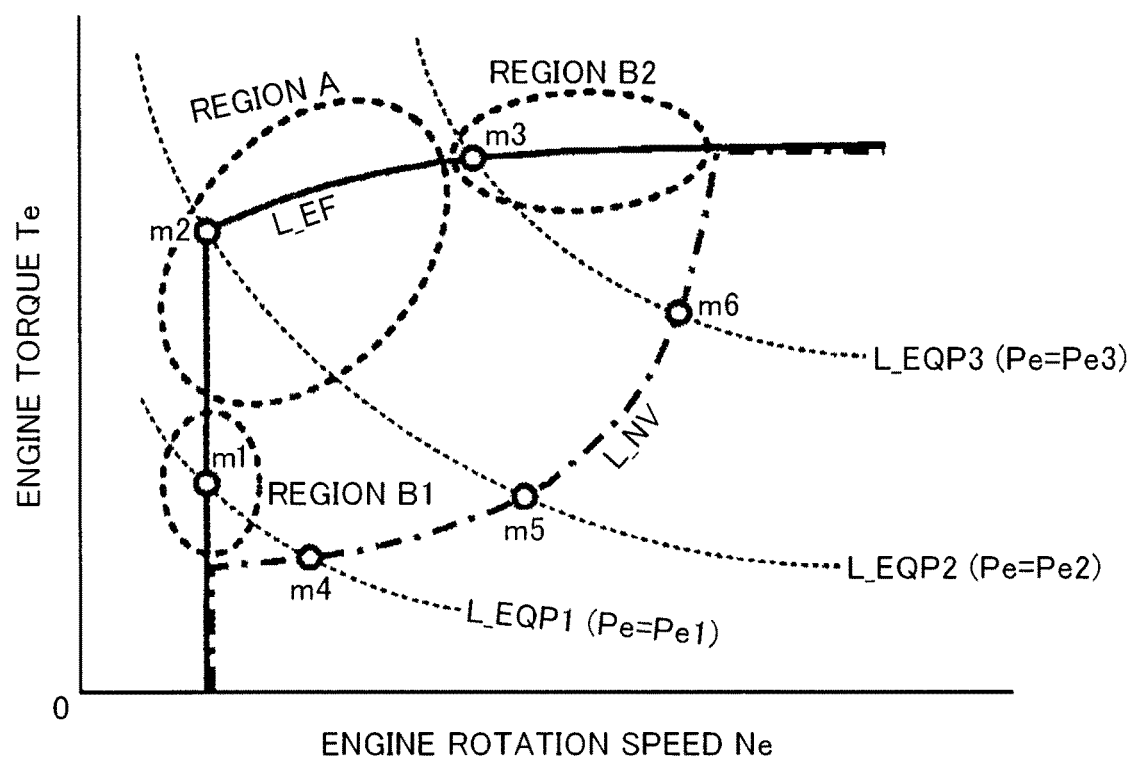
FIG. 9 is a conceptual view of an engine operation point plane.

The significance of the region A, the region B1, the region B2 and adjustment of the gain G in vibration noise suppression control according to the second embodiment will be specifically described with reference to FIG. 9 and FIG. 10. FIG. 9 is a conceptual view of the operation point plane of the engine EG. In FIG. 9, like reference signs denote portions that overlap with those of FIG. 4, and the description thereof is omitted where appropriate.

In FIG. 9, the region A, the legion B1 and the region B2 are output ranges that are defined in the fuel economy operation line L_EF. That is, the region A is the region of the engine power Pe, in which the thermal efficiency ηe of the engine EG is relatively high. The region B1 is a power region on a lower torque side than the region A. The region B2 is a power region on a higher rotation side than the region A. Generally, torque pulsation that occurs in the crankshaft of the engine EG increases as the engine rotation speed Ne decreases in the case where torque is constant, and increases as the engine torque Te increases in the case where rotation is constant. The former is because the frequency of torque pulsation decreases with a decrease in the engine rotation speed Ne. The latter is because torque pulsation of the crankshaft is exactly the pulsation of the engine torque Te.

Figure 10:
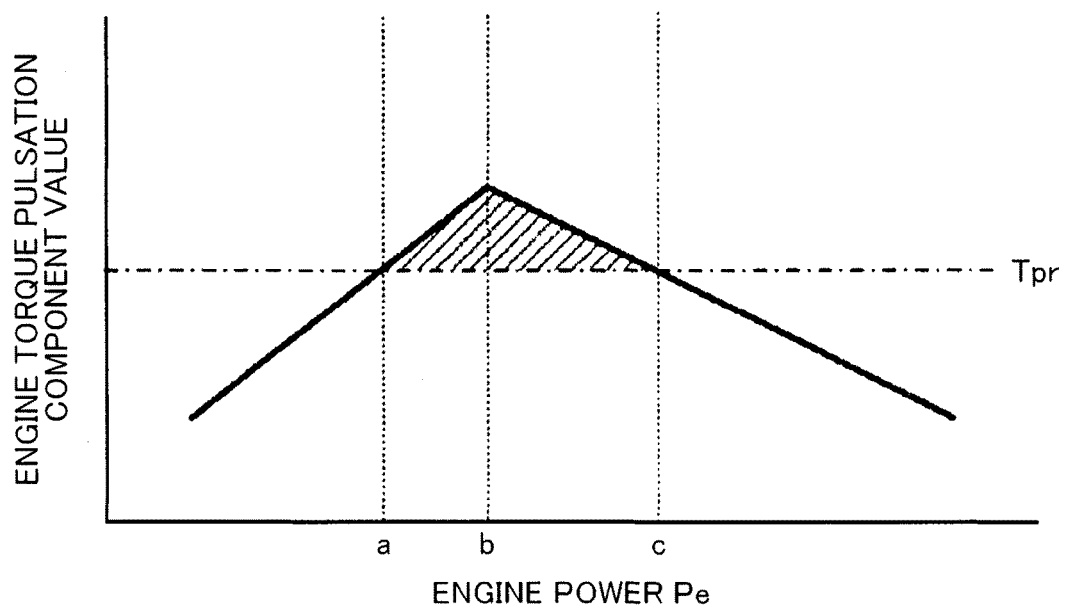
FIG. 10 is a graph that illustrates the correlation between an engine torque pulsation component value and a pressing torque.

On the other hand, FIG. 10 is a graph that illustrates the correlation between the pressing torque Tpr and torque pulsation of the drive shaft DS.

In FIG. 10, the abscissa axis represents engine power Pe, and the ordinate axis represents engine torque pulsation component value. The engine torque pulsation component value is the maximum amplitude value of pulsation torque of the engine EG in the case where the operation point is moved along the fuel economy operation line L_EF.

FIG. 10 illustrates a state where the pulsation torque becomes maximum at engine power Pe=b and decreases in power regions on lower and higher power sides with respect to b. As shown in the correlation between the engine torque pulsation component value and the pressing torque Tpr (see the alternate long and short dashed line), the engine torque pulsation component value is smaller than the pressing torque Tpr in a low power region in which the engine power Pe<a (a<b) and in a high power region in which the engine power Pe>c (c>b).

That is, when a hatched region in which the engine power Pe satisfies a<Pe<c is excluded, it is possible to properly suppress torque pulsation of the drive shaft DS even by only the pressing torque Tpr. The region A substantially corresponds to the hatched region, the region B1 is on a lower power side than the hatched region, and the region B2 is on a higher power side than the hatched region.

Referring back to FIG. 9, as described with reference to FIG. 10, torque pulsation that appears in the drive shaft DS in the region B1 or in the region B2 is more easily suppressed than that in the region A. This tendency strengthens toward a low torque side (a low power side in FIG. 10) in the region B1, and strengthens toward a high rotation side (a high power side in FIG. 10) in the region B2. This means that it becomes easy to suppress torque pulsation of the drive shaft DS by using the pressing torque Tpr.

However, the pressing torque Tpr is not the pulsation torque, so whether suppression of vibration noise is successful does not merely depend on only the magnitude of torque. Therefore, in the present embodiment, the gain G that is multiplied by the base pulsation compensation torque Tpcb is adjusted in response to the engine power Pe. That is, specifically, as the engine torque Te changes toward a low torque side in the region B1, the gain G approaches zero, and, as the engine rotation speed Ne changes toward a high rotation side in the region B2, the gain G approaches zero. That is, in the present embodiment, the pressing torque Tpr is used to suppress torque pulsation of the drive shaft DS more actively than that in the first embodiment.

When the engine power Pe does not fall within the region A, the region B1, or the region B2, as is apparent from FIG. 9, the fuel economy operation line L_EF substantially coincides with the vibration noise suppression operation line L_NV that does not require the damping torque Tvs. Thus, in such a case, no pulsation compensation torque Tpc is required, and the gain G is set to 0.

The pressing torque Tpr increases or decreases depending on the operating condition of the hybrid vehicle 1. Thus, a boundary value that prescribes the magnitude relation with the engine torque pulsation component value can slightly change each time. In terms of this point, it is desirable to have such a configuration that the gain G continuously (at least in multiple stages) to some extent.

2.2: Advantageous Effect of Vibration Noise Suppression Control

In outputting the pulsation compensation torque Tpc, it is obvious that the amount of electric power taken out from the direct-current power supply B decreases as the gain G decreases. That is, by adjusting the gain G of the pulsation compensation torque Tpc in response to the engine power Pe, it is possible to further improve the energy efficiency of the hybrid vehicle 1. That is, with the vibration noise suppression control according to the present embodiment, it is possible to further economically suppress torque pulsation of the drive shaft DS.

The energy efficiency of the hybrid vehicle 1 means energy utilization efficiency in the overall hybrid vehicle 1, including not only a fuel consumption of the engine EG but also an electric power consumption in the motor generators MG1, MG2. That is, in the hybrid vehicle 1, the SOC of the direct-current power supply B is kept within a predetermined control range through known SOC control, and a source of electric power that is used to charge the direct-current power supply B is configured to be provided by power generation of the motor generator MG1 by using part of the engine torque Te (torque Tes prescribed by the above-described mathematical expression (1)) except a special case, that is, the time during decelerating regeneration, the time during external charging, or the like.

Thus, even when the engine EG is operated in a region in which the thermal efficiency is high (that is, the fuel consumption rate is uniquely low), the energy efficiency of the hybrid vehicle 1 is not always improved when the electric power consumption in the motor generators is large. That is, it is required to carry out total energy management that takes into consideration the engine EG and the motor generators.

According to the present embodiment, by adjusting the gain G, the electric power consumption in the motor generator MG2 can be saved or reduced as much as possible. Thus, a practical advantage is large in terms of improving the energy efficiency of the hybrid vehicle 1.

3: Third Embodiment

3.1: Details of Vibration Noise Suppression Control

Figure 11:
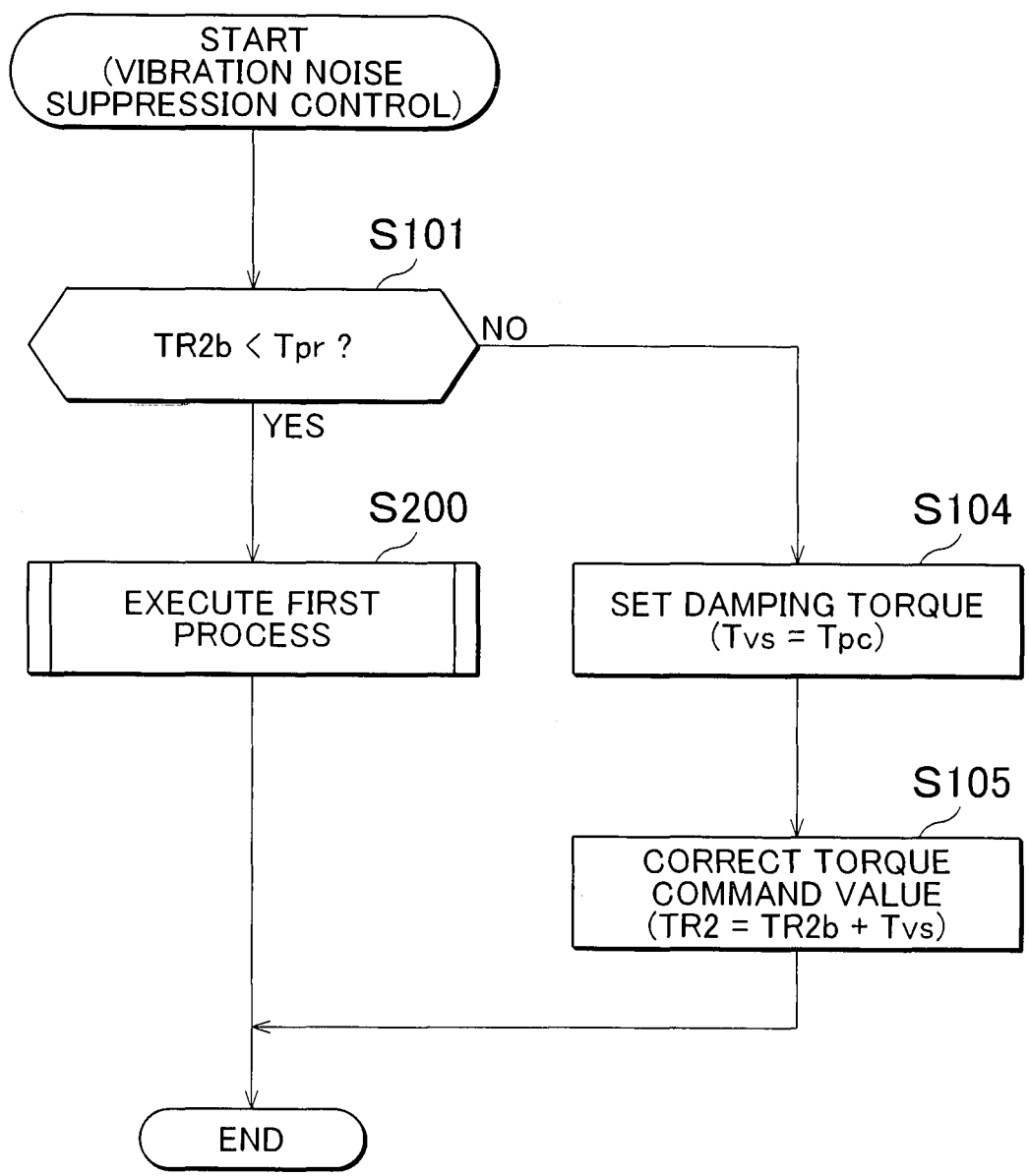
FIG. 11 is a flowchart of vibration noise suppression control according to a third embodiment of the invention.

Next, vibration noise suppression control according to a third embodiment of the invention, which is different from those of the first and second embodiments, will be described with reference to FIG. 11. FIG. 11 is a flowchart of vibration noise suppression control according to the third embodiment. In FIG. 11, like reference signs denote portions that overlap with those of FIG. 5, and the description thereof is omitted. A vehicle configuration according to the third embodiment is the same as the hybrid vehicle 1 according to the first embodiment.

As shown in FIG. 11, when the reference torque command value TR2b is smaller than the pressing torque Tpr (YES in step S101), the ECU 100 executes a first process (step S200). When the first process has been executed, the vibration noise suppression control ends.

Figure 12:
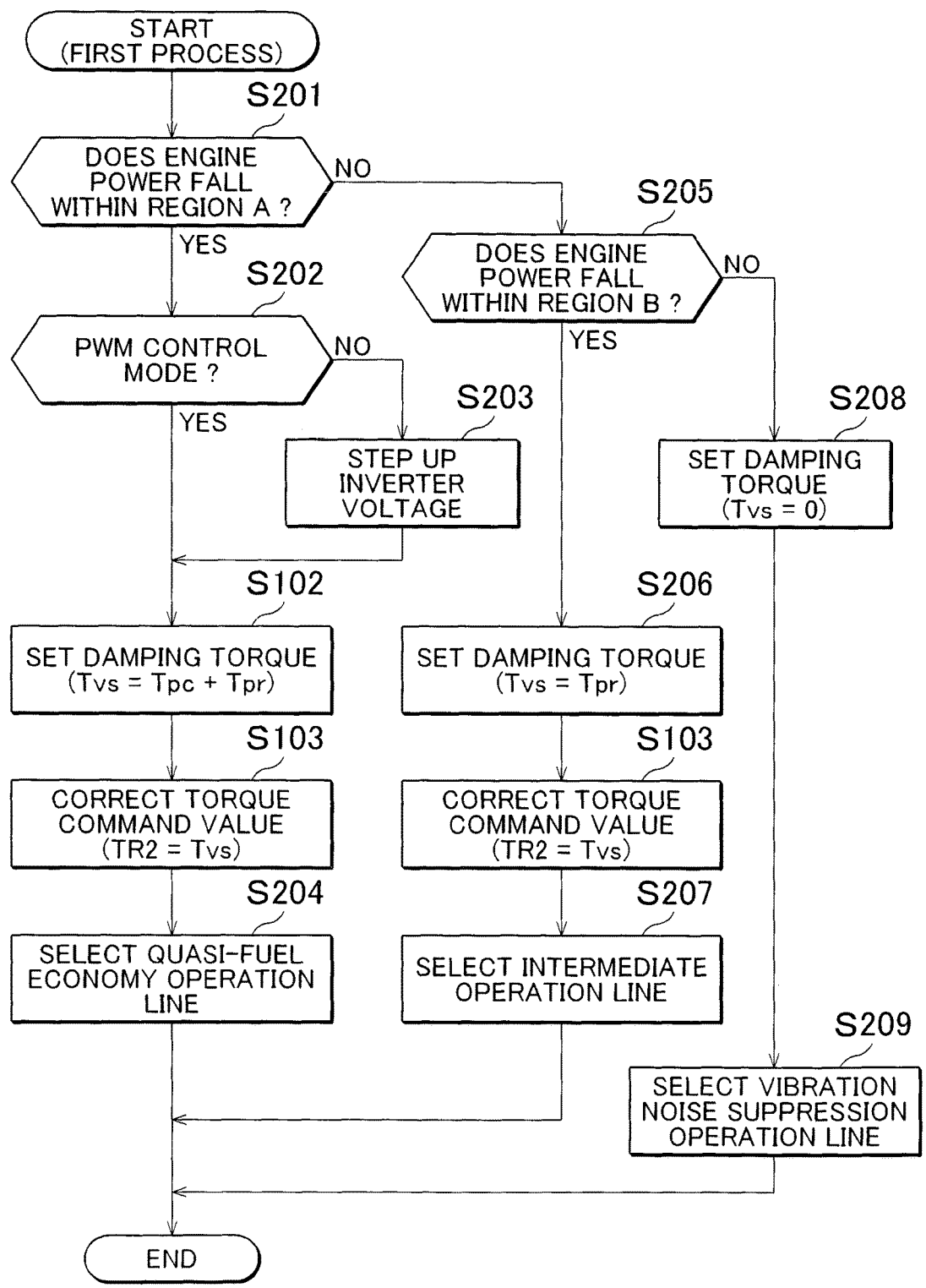
FIG. 12 is a flowchart of a first process in control shown in FIG. 11.

The first process will be described with reference to FIG. 12. FIG. 12 is a flowchart of the first process. In FIG. 12, like reference signs denote portions that overlap with those of FIG. 5, and the description thereof is omitted.

Figure 13:
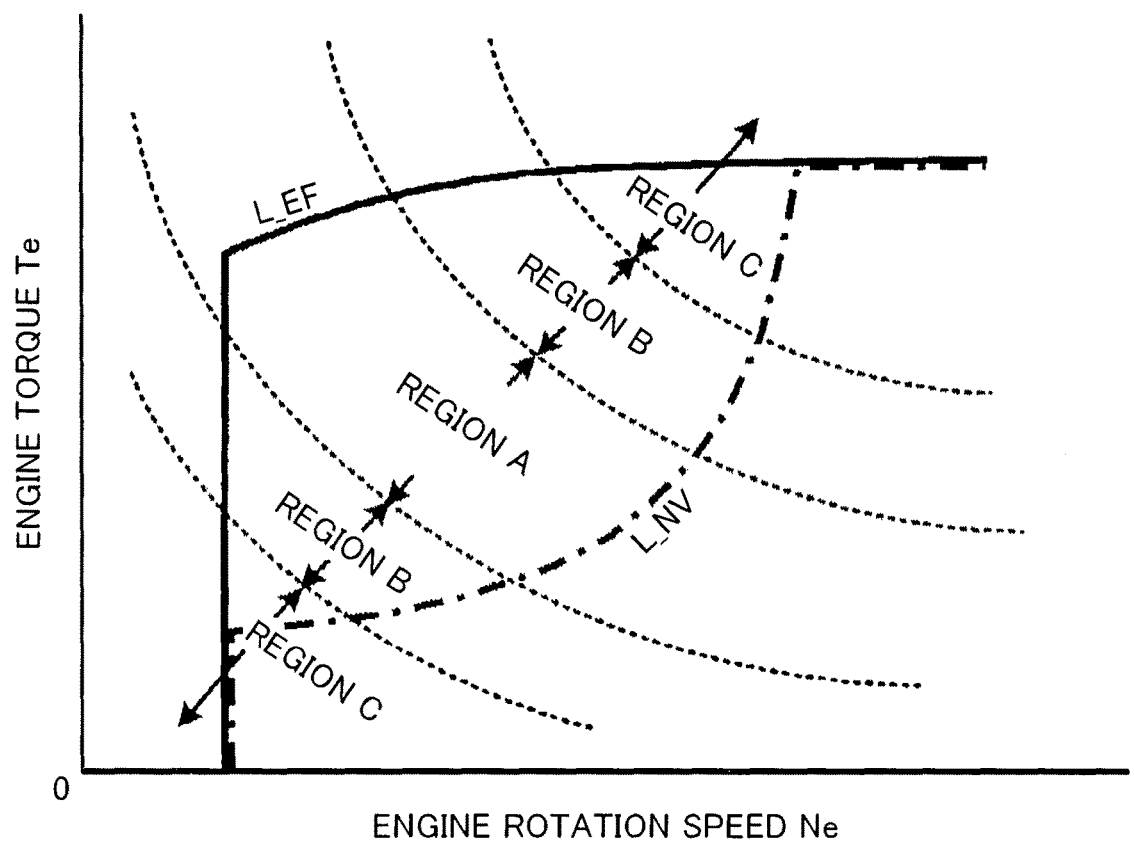
FIG. 13 is a conceptual view of an engine operation point plane.

As shown in FIG. 12, the ECU 100 determines whether the engine power Pe falls within a region A (step S201). The region A will be described with reference to FIG. 13. FIG. 13 is a conceptual view of the operation point plane of the engine EG. In FIG. 13, like reference signs denote portions that overlap with those of FIG. 9, and the description thereof is omitted.

FIG. 13 shows the operation point plane of the engine EG. In the operation point plane, as in the case of the foregoing description, the fuel economy operation line L_EF and the vibration noise suppression operation line L_NV are shown. In the vibration noise suppression control according to the third embodiment, as in the case of the second embodiment, an action associated with suppression of vibration noise is different in response to a power region in which the engine power Pe falls. In addition, in the third embodiment, the region A, a region B and a region C are set instead of the region A, the region B1 and the region B2 described in the second embodiment.

In FIG. 13, the region A, as well as the region A in the second embodiment, is a power region in which the thermal efficiency ηe of the engine EG is relatively high. The degree of improvement in the thermal efficiency of the engine EG (that is, uniquely, the degree of improvement in fuel consumption rate) in the case where the fuel economy operation line L_EF is used instead of the vibration noise suppression operation line L_NV is substantially proportional to a travel distance along an equal power line between these operation lines. That is, as the travel distance increases, a larger advantage is obtained by using the fuel economy operation line L_EF in the case where the engine EG alone is taken into consideration.

In FIG. 13, the region A is a power region in which the degree of improvement in the thermal efficiency is the highest. The region B is set as a certain power range on a higher power side and on a lower power side than the region A. The above-described degree of improvement in the thermal efficiency in the region B is lower than that in the region A. The region C is a power range on a higher power side and on a lower power side than the region B. The degree of improvement in the thermal efficiency in the region C is lower than that in the region B. In the present embodiment, the degree of improvement in the thermal efficiency is significant.

Referring back to FIG. 12, when the engine power Pe falls within the region A (YES in step S201), the ECU 100 determines whether the control mode of the motor generator MG2 is the PWM control mode (step S202). When the control mode of the motor generator MG2 is not the PWM control mode (NO in step S202), the ECU 100 steps up the system voltage VH through control over the step-up converter 21 (step S203). When the system voltage VH is stepped up to a voltage value suitable for the PWM control mode or the control mode of the motor generator MG2 is already the PWM control mode (YES in step S202), the ECU 100 sets the damping torque Tvs (step S102). That is, in this case, the damping torque Tvs is set to the sum of the pressing torque Tpr and the pulsation compensation torque Tpc.

When the damping torque Tvs is set, the torque command value TR2 of the motor generator MG2 is corrected (step S103), as is already described. That is, the torque command value TR2 is set to the damping torque Tvs (Tvs=Tpc+Tpr). When the torque command value TR2 is set to the damping torque Tvs, the ECU 100 selects a quasi-fuel economy operation line L_EF' as an operation line for controlling the engine EG (step S204). The quasi-fuel economy operation line L_EF' will be described later.

When the engine power Pe does not fall within the region A in step S201 (NO in step S201), the ECU 100 determines whether the engine power Pe falls within the region B described with reference to FIG. 13 (step S205). When the engine power Pe does not fall within the region B (NO in step S205), that is, when the engine power Pe falls within the region C, the ECU 100 sets the damping torque Tvs to zero (step S208), and selects the vibration noise suppression operation line L_NV as the operation line for controlling the engine EG (step S209).

On the other hand, when the engine power Pe falls within the region B in step S205 (YES in step S205), the ECU 100 sets the damping torque Tvs in accordance with the following mathematical expression (8) (step S206).

$$Tvs = Tpr \tag{8}$$

That is, when the engine power Pe falls within the region B, the damping torque Tvs is only the pressing torque Tpr. When the damping torque Tvs is set, the torque command value TR2 of the motor generator MG2 is set (that is, corrected) to the damping torque Tvs (Tvs=Tpr) (step S103). When the torque command value TR2 is corrected, the ECU 100 selects an intermediate operation line L_IM as the operation line for controlling the engine EG (step S207). When the operation line associated with control over the operation of the engine EG is selected in step S207, step S204 or step S209, the first process ends.

Figure 14:
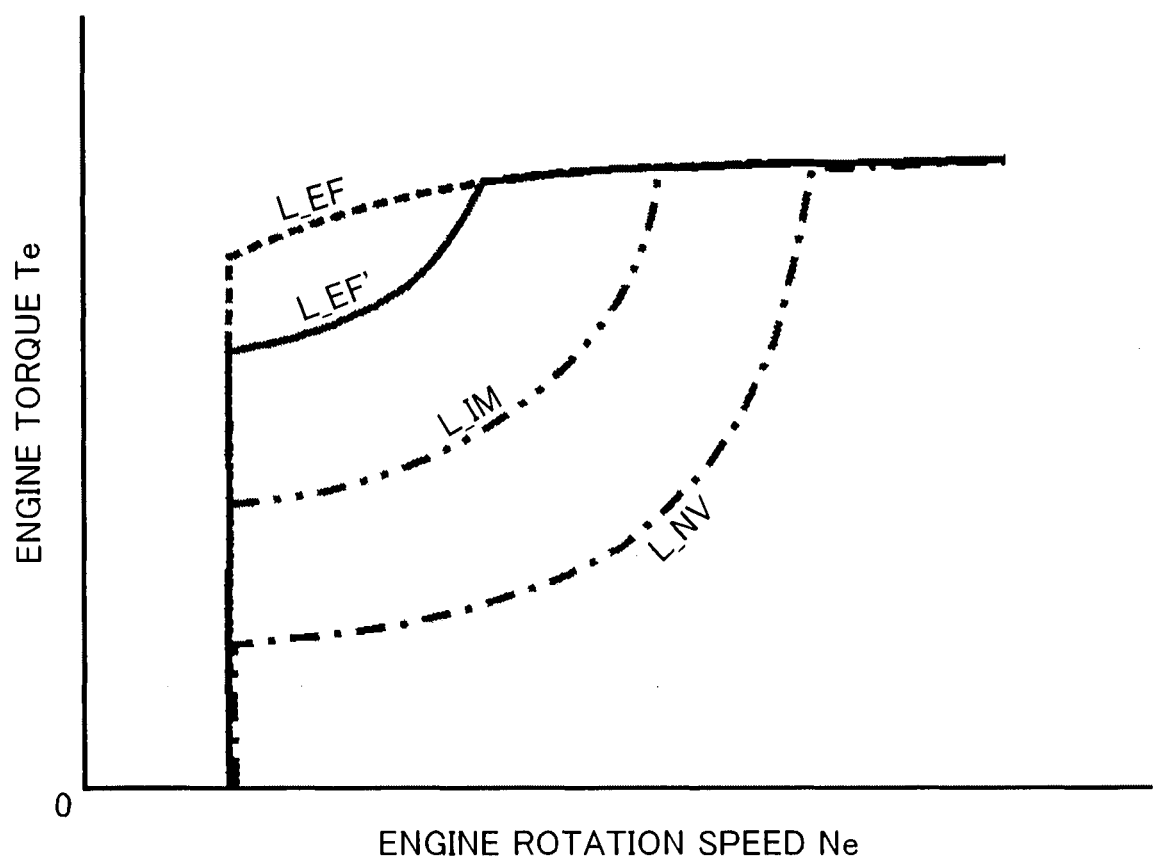
FIG. 14 is a conceptual view of engine operation lines in control shown in FIG. 11.

The quasi-fuel economy operation line L_EF' and the intermediate operation line L_IM will be described with reference to FIG. 14. FIG. 14 is a conceptual view of engine operation lines in the engine operation point plane. In FIG. 14, like reference signs denote portions that overlap with those of FIG. 13, and the description thereof is omitted.

In FIG. 14, the fuel economy operation line L_EF is indicated by the dashed line. The quasi-fuel economy operation line L_EF' (see the continuous line) is basically an operation line that coincides with the fuel economy operation line L_EF; however, the quasi-fuel economy operation line L_EF' is an operation line that is set such that realistic constraints are satisfied at a portion at which the fuel economy operation line L_EF cannot be used because of the realistic constraints. The realistic constraints are not unique, and vary depending on the vehicle configuration. Thus, depending on the vehicle configuration, the quasi-fuel economy operation line L_EF' may approach the fuel economy operation line L_EF with respect to the illustrated correlation or may conversely move away from the fuel economy operation line L_EF with respect to the illustrated correlation. The quasi-fuel economy operation line L_EF' is, in short, an operation line that is obtained by connecting operation points at each of which the thermal efficiency ηe of the engine EG is maximum within the range of the realistic constraints.

On the other hand, the intermediate operation line L_IM (see the alternate long and two-short dashed line) is an operation line set at the intermediate position between the quasi-fuel economy operation line L_EF' and the vibration noise suppression operation line L_NV. That is, the intermediate operation line L_NV is higher in the thermal efficiency ηe of the engine EG than the vibration noise suppression operation line L_NV and lower in the thermal efficiency ηe of the engine EG than the quasi-fuel economy operation line L_EF', and is larger in the degree of torque pulsation of the drive shaft DS than the vibration noise suppression operation line L_NV and smaller in the degree of torque pulsation of the drive shaft DS than the quasi-fuel economy operation line L_EF'. FIG. 14 shows only one intermediate operation line L_IM; however, of course, a plurality of the intermediate operation lines L_IM may be set.

3.2: Advantageous Effect of Vibration Noise Suppression Control

In the vibration noise suppression control according to the third embodiment, suppression of vibrations and noise of the hybrid vehicle 1 is achieved through the first process by an action according to any one of the following (A), (B) or (C).
(A) Quasi-fuel economy operation line, and Damping torque Tvs=Tpc+Tpr
(B) Intermediate operation line, and Damping torque Tvs=Tpr
(C) Vibration noise suppression operation line, and Damping torque Tvs=0
The action (A) is an example of a "first mode" according to the invention. The action (B) is an example of a "second mode" according to the invention. the action (C) is an example of a "third mode" according to the invention.

One of these actions (A) to (C) is selected so that the energy efficiency of the hybrid vehicle 1 is the highest. This will be specifically described with reference to FIG. 13 and FIG. 14.

As is already described, in FIG. 13, a travel distance along an equal power line (see the dashed line) between the operation lines corresponds to the degree of improvement in the thermal efficiency of the engine EG. Thus, when merely the thermal efficiency of the engine EG, that is, only the fuel consumption rate in operating the engine EG at a certain operation point, is considered, selecting the quasi-fuel economy operation line is the best.

However, when the quasi-fuel economy operation line L_EF' is selected, the damping torque Tvs includes the pulsation compensation torque Tpc in terms of suppressing vibration noise. Because the pulsation compensation torque Tpc is a pulsation torque, relatively high torque response is required to control the output of the pulsation compensation torque Tpc. Therefore, when the pulsation compensation torque Tpc is output, the control mode of the motor generator MG2 is set to the PWM control mode.

As is already described, the PWM control mode requires the power supply voltage VB of the direct-current power supply B to be stepped up by the step-up converter 21. In stepping up the power supply voltage VB to the system voltage VH, a step-up loss arises in the step-up converter 21. Because the step-up loss corresponds to useless consumption of electric power stored in the direct-current power supply B, the step-up loss leads to an increase in a power generation load of the motor generator MG1 that uses part of the engine torque Te (the above-described torque Tes) from the medium- and long-term viewpoints. That is, the fuel consumption rate in the engine EG is definitely deteriorated. When the amount of deterioration of the fuel consumption rate is larger than the amount of improvement of the fuel consumption rate resulting from usage of the quasi-fuel economy operation line L_EF', the energy efficiency of the hybrid vehicle 1 decreases on the contrary as a result of usage of the quasi-fuel economy operation line L_EF'.

Of course, such discussion does not hold until suppression of torque pulsation of the drive shaft DS is sufficiently ensured. Thus, when the engine power Pe belongs to the region A in which the torque pulsation of the drive shaft DS is large and the degree of improvement in the thermal efficiency of the engine EG is large, the action (A) for outputting the pulsation compensation torque Tpc is the best selection.

On the other hand, on the lower power side and on the higher power side with respect to the region A, the magnitude of the torque pulsation of the drive shaft DS decreases, and the degree of improvement in the thermal efficiency of the engine EG in the case where the quasi-fuel economy operation line L_EF' is used decreases. In such a power region, by further reducing the magnitude of the torque pulsation of the drive shaft DS through selection of the intermediate operation line L_IM, it is possible to suppress vibration noise caused by only the pressing torque Tpr. At the same time, the amount of decrease in electric power loss resulting from not using the PWM control mode becomes larger than the amount of degrease in the thermal efficiency of the engine EG resulting from selecting the intermediate operation line L_IM. That is, the energy efficiency of the hybrid vehicle 1 when the action (B) is selected is higher than the energy efficiency of the hybrid vehicle 1 when the action (A) is selected, so the action (B) is the best selection.

On the other hand, on the lower power side and on the higher power side with respect to the region B, the magnitude of the torque pulsation of the drive shaft DS further decreases and the degree of improvement in the thermal efficiency of the engine EG in the case where the quasi-fuel economy operation line L_EF is used further decreases. In such a power region, the difference in thermal efficiency between the intermediate operation line L_IM and the vibration noise suppression operation line L_NV decreases, and the electric power consumption for outputting the pressing torque Tpr becomes higher than the amount of decrease in thermal efficiency resulting from selecting the vibration noise suppression operation line L_NV. Therefore, the energy efficiency of the hybrid vehicle 1 when the action (C) is selected is higher than the energy efficiency of the hybrid vehicle 1 when the action (B) is selected, so the action (C) is the best selection.

In this way, in the present embodiment, focusing on the energy efficiency of the hybrid vehicle 1 in consideration of the influence of the electric power consumption resulting from operation of the motor generator MG2 on the fuel consumption of the engine EG, the action for obtaining the highest energy efficiency of the hybrid vehicle 1 is selected from among the actions (A) to (C). Thus, it is possible to keep the realistically maximum energy efficiency of the hybrid vehicle 1 while suppressing the torque pulsation of the drive shaft DS, so a practical advantage is large.

The present embodiment focuses on the energy efficiency of the hybrid vehicle 1; however, a process of calculating and comparing the efficiency each time in the case of selecting one of the actions is not necessarily required. That is, a power value as a selection reference value is determined such that selecting the action (A) is the best in the region A, selecting the action (B) is the best in the region B and selecting the action (C) is the best in the region C. Thus, actual control is configured so that the above-described advantageous effect is obtained by comparing the engine power Pe with the power value as the selection reference value and then selecting, the action in response to the compared result.

Power values that prescribe the region A, the region B and the region C may be variable in response to the various operating conditions of the hybrid vehicle 1. For example, when the SOC of the direct-current power supply B is high, because a larger amount of electric power consumption is allowed, the region A in which the action (A) having the largest electric power consumption is selected may be expanded. Conversely, when the SOC of the direct-current power supply B is low, because a smaller amount of electric power consumption is desired, the region A in which the action (A) having the largest electric power consumption is selected may be reduced.

4: Fourth Embodiment

Figure 15:
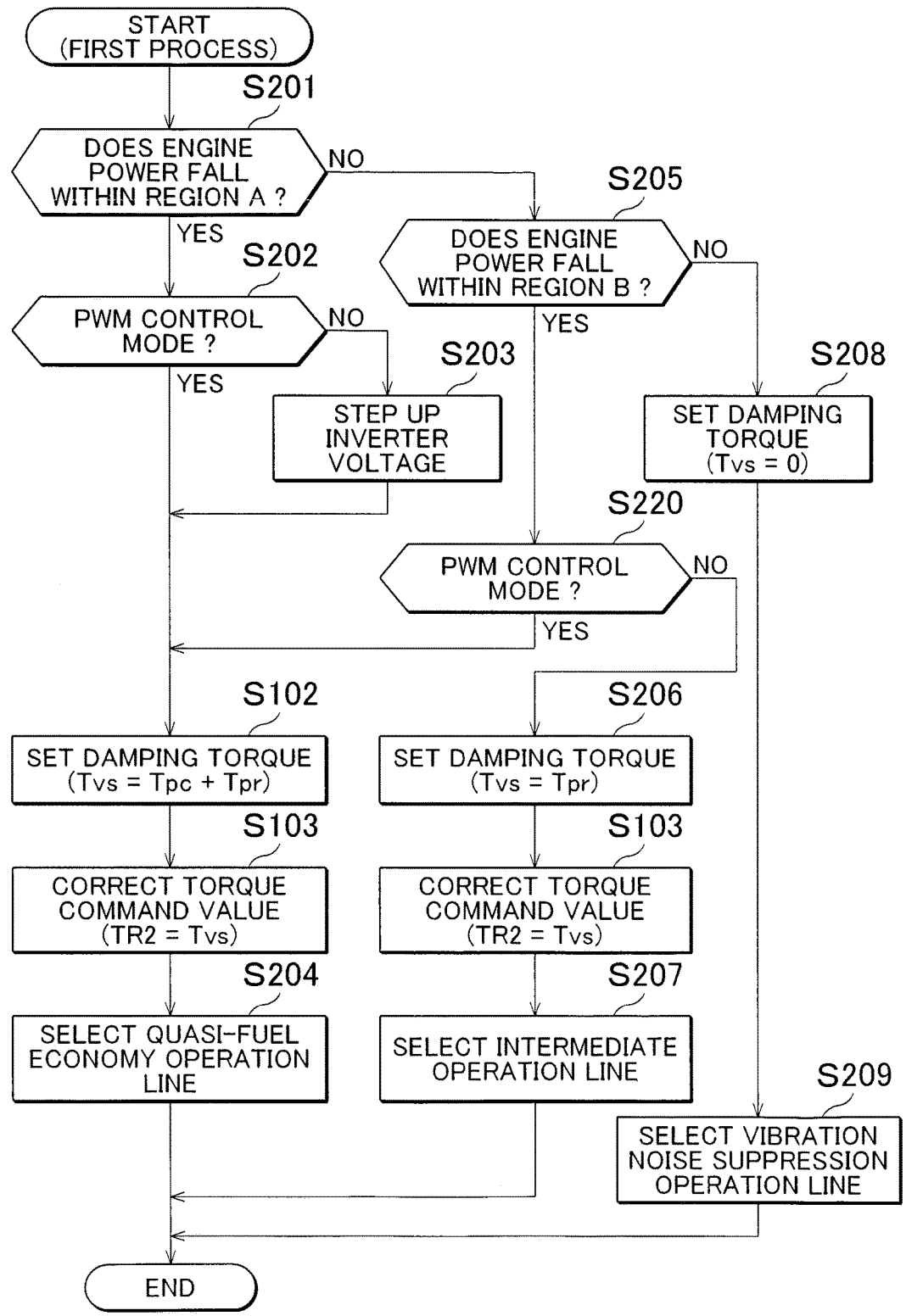
FIG. 15 is another flowchart of the first process in control shown in FIG. 11 according to a fourth embodiment of the invention.

Next, a first process according to a fourth embodiment of the invention, which is slightly different from the first process of the third embodiment, will be described with reference to FIG. 15. FIG. 15 is a flowchart that illustrates another mode of the first process. In FIG. 15, like reference signs denote portions that overlap with those of FIG. 12, and the description thereof is omitted where appropriate.

As shown in FIG. 15, when the engine power Pe falls within the region B in step S205 (YES in step S205), the ECU 100 determines whether the control mode of the motor generator MG2 is the PWM control mode (step S220). When the control mode of the motor generator MG2 is not the PWM control mode (NO in step S220), that is, the control mode is the rectangular wave control mode, the process proceeds to step S206, and the process proceeds as described in the third embodiment.

On the other hand, when the control mode of the motor generator MG2 is the PWM control mode (YES in step S220), the ECU 100 proceeds with the process to step S102, and sets the damping torque Tvs to the sum of the pressing torque Tpr and the pulsation compensation torque Tpc. That is, the same process as in the case where the engine power Pe falls within the region A is executed, and the quasi-fuel economy operation line L_EF" is used as the operation line of the engine EG.

In this way, according to the present embodiment, even when the engine power Pe falls within the region B, but when the PWM control mode is already selected as the control mode of the motor generator MG2, a step-up loss in the case where the PWM control mode is selected is ignored because the PWM control mode is not intentionally selected for the purpose of suppressing vibration noise of the vehicle. As a result, the action (A) having the higher energy efficiency of the hybrid vehicle 1 than the action (B) is selected, so it is possible to further precisely optimize the energy efficiency of the hybrid vehicle 1.

5: Fifth Embodiment 5.1: Details of Vibration Noise Suppression Control

Figure 16:
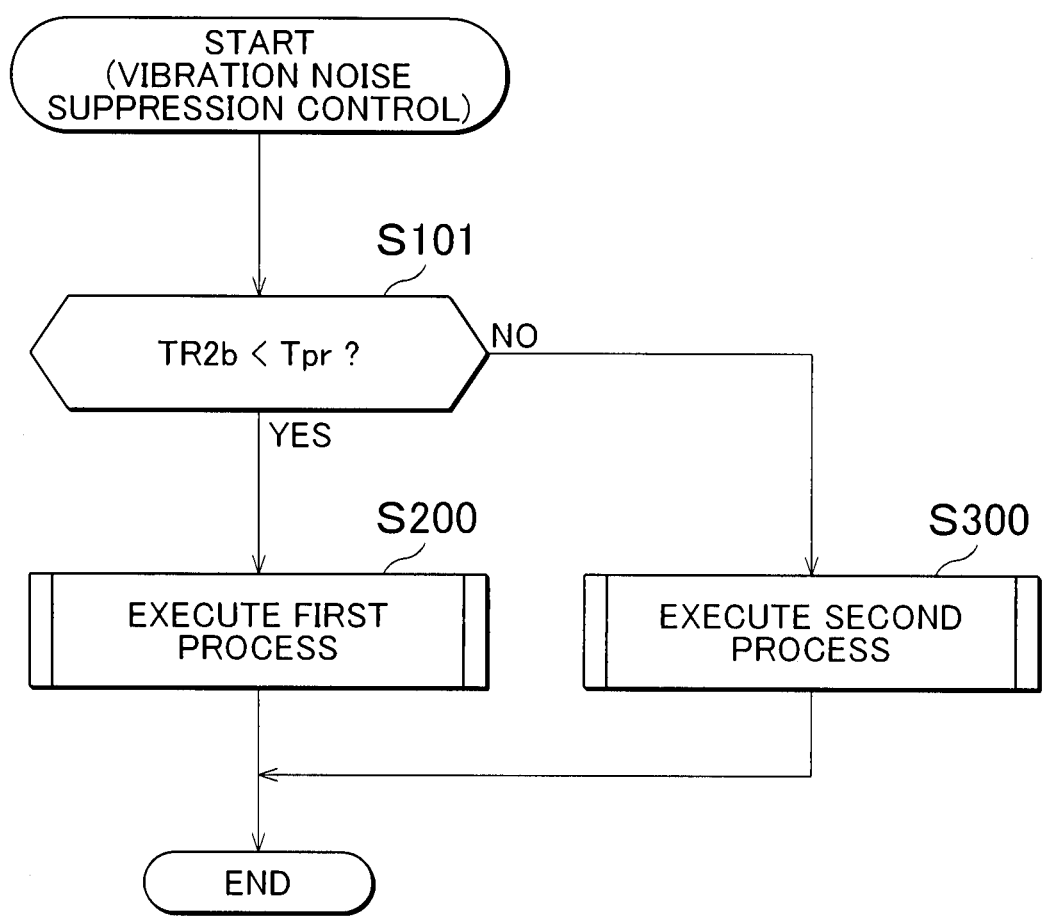
FIG. 16 is a flowchart of vibration noise suppression control according to a fifth embodiment of the invention.

Next, vibration noise suppression control according to a fifth embodiment of the invention will be described with reference to FIG. 16. FIG. 16 is a flowchart of vibration noise suppression control according to the fifth embodiment. In FIG. 16, like reference signs denote portions that overlap with those of FIG. 11, and the description thereof is omitted.

As shown in FIG. 16, when the reference torque command value TR2$b$ is larger than or equal to the pressing torque Tpr (NO in step S101), the ECU 100 executes a second process (step S300). The process described in the third or fourth embodiment may be applied as the first process.

Figure 17:
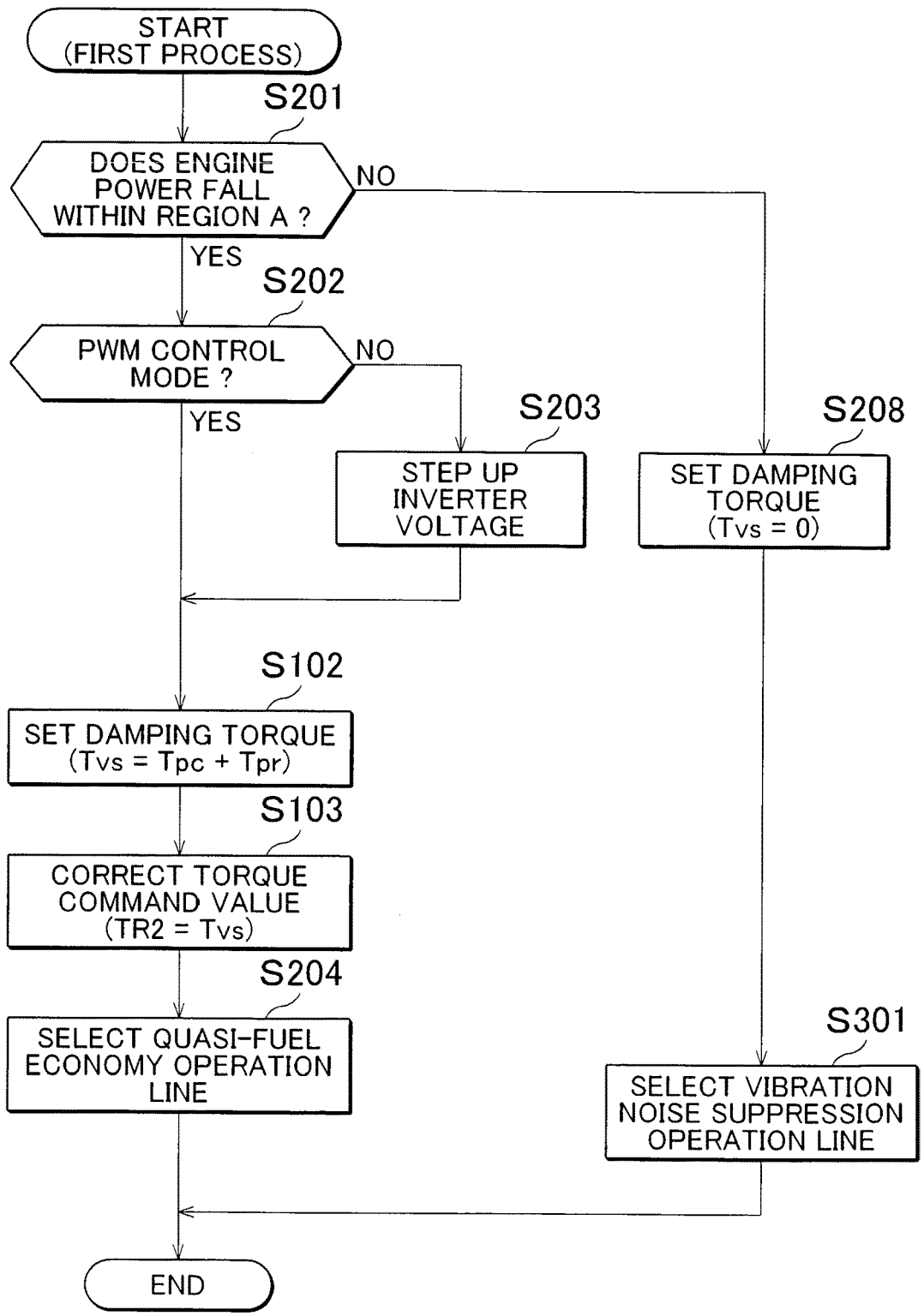
FIG. 17 is a flowchart of a second process in control shown in FIG. 16.

The details of the second process will be described with reference to FIG. 17. FIG. 17 is a flowchart of the second process. In FIG. 17, like reference signs denote portions that overlap with those of FIG. 12, and the description thereof is omitted where appropriate.

As shown in FIG. 17, when the engine power Pe does not fall within the region A (NO in step S201), the ECU 100 proceeds with the process to step S208, sets the damping torque Tvs to zero, and selects the vibration noise suppression operation line L_NV' (step S301).

Figure 18:
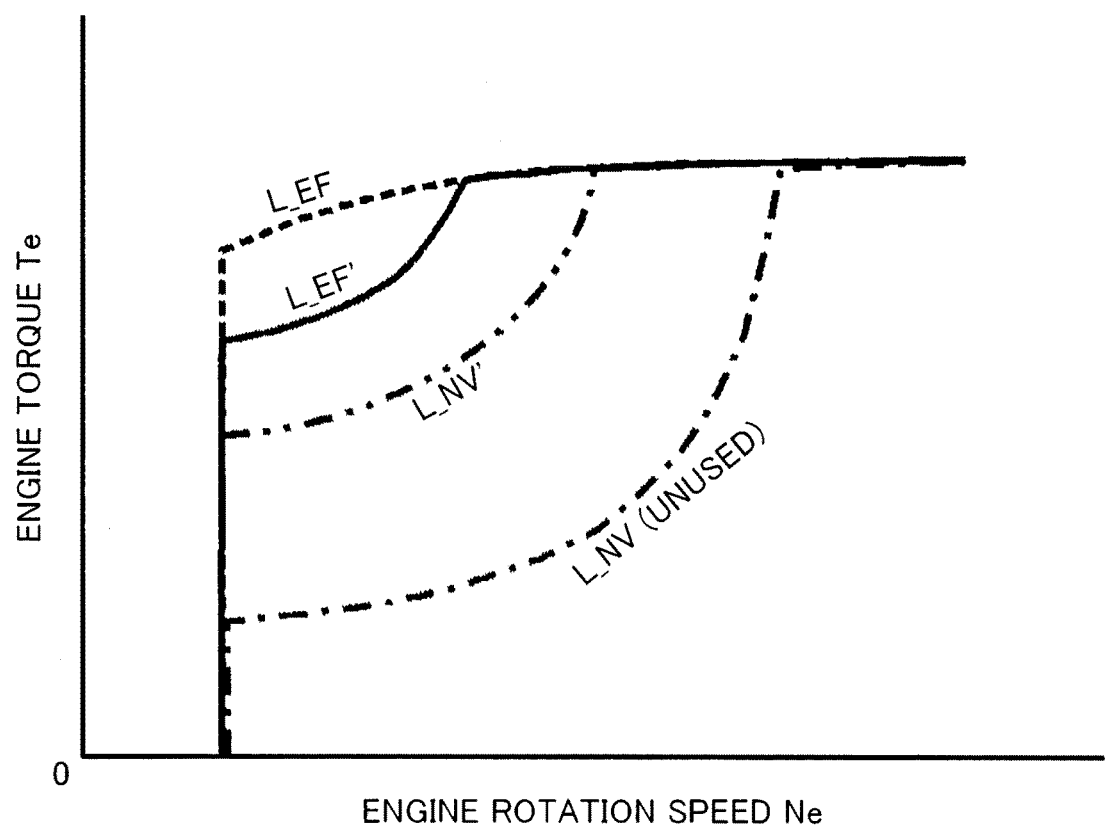
FIG. 18 is a conceptual view of engine operation lines in control shown in FIG. 17.

The vibration noise suppression operation line L_NV' will be described with reference to FIG. 18. FIG. 18 is a conceptual view of engine operation lines in the second process. In FIG. 18, like reference signs denote portions that overlap with those of FIG. 14, and the description thereof is omitted.

FIG. 18 illustrates the already-described operation point plane. In the operation point plane, a plurality of operation lines that can be subjected to control over the operation of the engine EG are illustrated. The vibration noise suppression operation line L_NV illustrated by the alternate long and short dashed line is the vibration noise suppression operation line in the case where the reference torque command value TR2$b$ is smaller than the pressing torque Tpr, which has been described in the first to fourth embodiments. However, because the second process is a process in the case where the reference torque command value TR2$b$ is larger than or equal to the pressing torque Tpr, the vibration noise suppression operation line L_NV is not used.

On the other hand, when the reference torque command value TR2$b$ is larger than or equal to the pressing torque Tpr, looseness in a drive system interposed between the motor generator MG2 and the drive shaft DS is already filled, so the MG2 torque Tmg2 is allowed to be used as an alternative torque to the damping torque Tvs. Therefore, all the action associated with suppression of vibration noise of the vehicle is not required to be provided at the engine EG side, so the vibration noise suppression operation line becomes L_NV' (see the alternate long and two-short dashed line) having a higher thermal efficiency than L_NV.

As a result of a change of the vibration noise suppression operation line from L_NV to L_NV', the difference in thermal efficiency between the quasi-fuel economy operation line L_EF' and the vibration noise suppression operation line decreases, so the intermediate operation line L_IM described in the third and fourth embodiments are not necessarily required. That is, when the reference torque command value TR2$b$ is larger than or equal to the pressing torque Tpr, it is possible to achieve both suppression of a decrease in the energy efficiency of the hybrid vehicle 1 and suppression of vibration noise of the hybrid vehicle 1 by changing the operation line between the two operation lines, that is, the quasi-fuel economy operation line L_EF' and the vibration noise suppression operation line L_NV'.

In the fifth embodiment, the MG2 torque Tmg2 at that timing can take various values. The magnitude of the MG2 torque Tmg2 corresponds to the magnitude of the degree of suppression of the torque pulsation of the drive shaft DS, so the magnitude of the reference torque command value TR2$b$ influences a geometrical positional relationship between the vibration noise suppression operation line L_NV' and the quasi-fuel economy operation line L_EF'. That is, as the reference torque command value TR2$b$ increases, the vibration noise suppression operation line L_NV' gradually approaches the quasi-fuel economy operation line L_EF'. Thus, in the fifth embodiment, the vibration noise suppression operation line L_NV' may be variable in response to the reference torque command value TR2$b$.

6: Sixth Embodiment

In a sixth embodiment, control in the case where the motor generator MG1 or the motor generator MG2 is in an abnormal state will be described.

As a precondition of the sixth embodiment, the ECU 100 executes the process of diagnosing at predetermined intervals whether the motor generator MG1 or the motor generator MG2 is in an abnormal state. This diagnosing process includes binary determination as to whether the motor generator is in an abnormal state and identification of the details of an abnormality. The former is the process of determining whether the motor generator is normal, and the latter is the process of, when it is determined that the motor generator is not normal, identifying, for example, the motor generator is able to output torque and how much the motor generator is able to output torque. Known various methods are disclosed as abnormality diagnosis of the motor generator of this type, so the detailed description thereof is omitted. For example, abnormality diagnosis of this type may be carried out on the basis of the behavior of an actual torque to a torque command value, the behavior of a line voltage of the motor generator, and the like. Alternatively, abnormality diagnosis of this type may be carried out on the basis of, for example, an abnormality signal that is output from the self-protection circuit of the phase switching elements that constitute the inverter 22 or the inverter 23.

6.1: Details of MG2 Abnormal-Time Control

Figure 19:
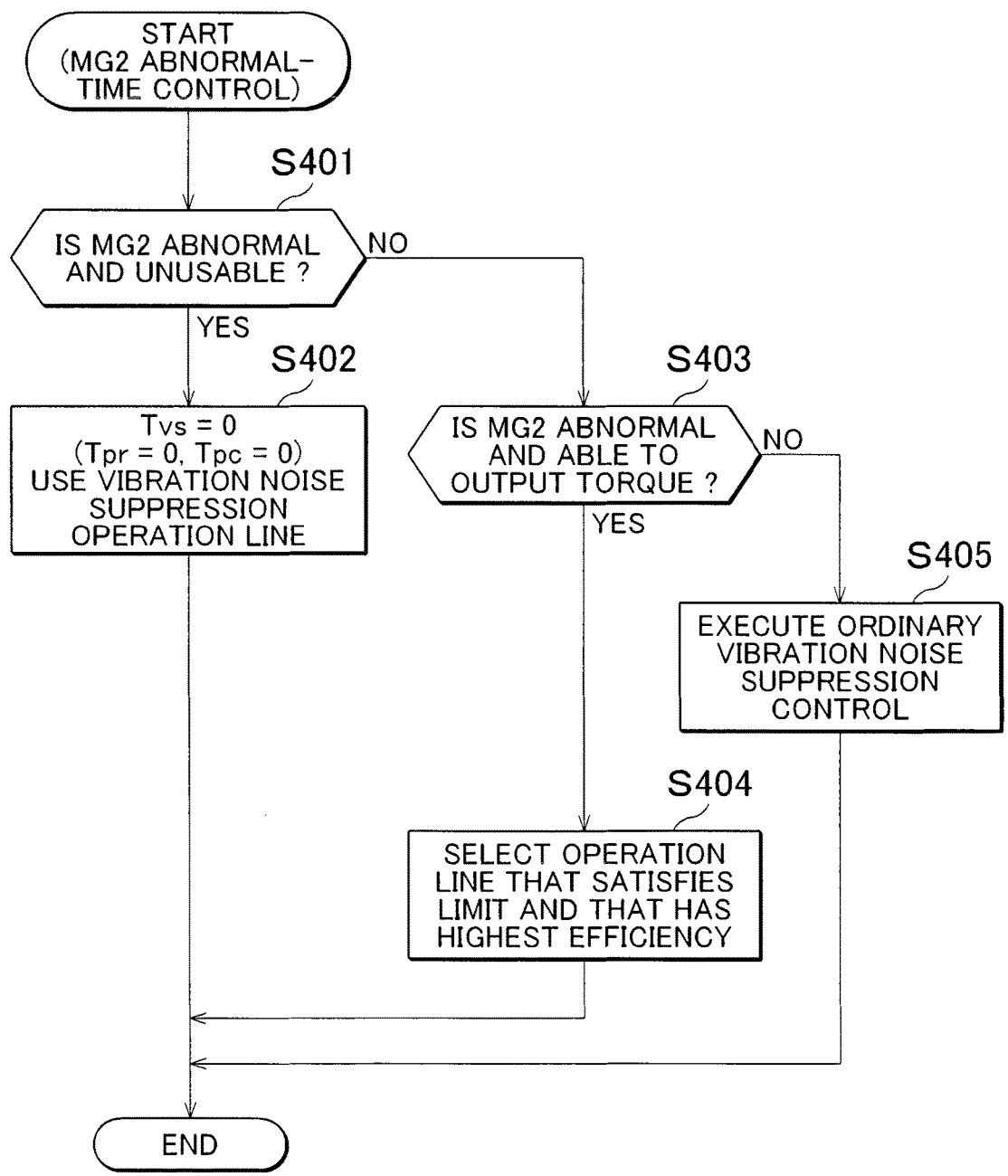
FIG. 19 is a flowchart of MG2 abnormal-time control according to a sixth embodiment of the invention.

Initially, MG2 abnormal-time control that is executed in the case where the motor generator MG2 is in an abnormal state will be described with reference to FIG. 19. FIG. 19 is a flowchart of MG2 abnormal-time control.

As shown in FIG. 19, the ECU 100 references the diagnosed result of an abnormality diagnosis process that is executed separately, and determines whether the motor generator MG2 is in the abnormal state and unusable (step S401). The "unusable" means that output of practically significant torque is impossible.

When the motor generator MG2 is in the abnormal state and unusable (YES in step S401), the ECU 100 sets both the pressing torque Tpr and the pulsation compensation torque Tpc to zero, and stops suppression of vibration noise by using the damping torque Tvs. On the other hand, the ECU 100 selects the vibration noise suppression operation line L_NV as the operation line of the engine EG, and executes suppression of noise vibration caused by only the engine EG (step S402). Step S402 is a kind of fail-safe, operation.

On the other hand, when the motor generator MG2 is not in the abnormal state or not unusable even in the abnormal state (NO in step S401), the ECU 100 further determines whether the motor generator MG2 is in the abnormal state and is able to output torque (step S403). When the motor generator MG2 is not in the abnormal state (NO in step S403), the ECU 100 allows to execute ordinary vibration noise suppression control (step S405). The ordinary vibration noise suppression control indicates the various vibration noise suppression controls illustrated in the first to fifth embodiments.

When the motor generator MG2 is in the abnormal state and is able to output torque (YES in step S403), the ECU 100 selects the operation line having the highest energy efficiency from among the selectable operation lines within the range of the torque output limit of the motor generator MG2 (step S404).

For example, in the case of the fuel economy operation line L_EF, the intermediate operation line L_IM and the vibration noise suppression operation line L_NV illustrated in the third or fourth embodiment, the magnitude of torque that is required of the motor generator MG2 increases in order of the vibration noise suppression operation line, the intermediate operation line and the fuel economy operation line. In this case, in a situation that the fuel economy operation line L_EF should be selected (for example, when the engine power Pe falls within the region A, or the like), when the motor generator MG2 is in the abnormal state to such an extent that the motor generator MG2 is not able to output the pulsation compensation torque Tpc, the intermediate operation line L_IM is used as the second best solution, and vibration noise is suppressed by setting the damping torque Tvs to only the pressing torque Tpr.

In this way, with the MG2 abnormal-time control, in a configuration that is able to carry out abnormality diagnosis of the motor generator MG2 by effectively utilizing the diagnosed result associated with the abnormality diagnosis in the vibration noise suppression control, it is possible to suppress noise and vibrations of the hybrid vehicle 1 due to torque pulsation of the drive shaft DS while keeping the energy efficiency of the hybrid vehicle 1 as high as possible.

Figure 20:
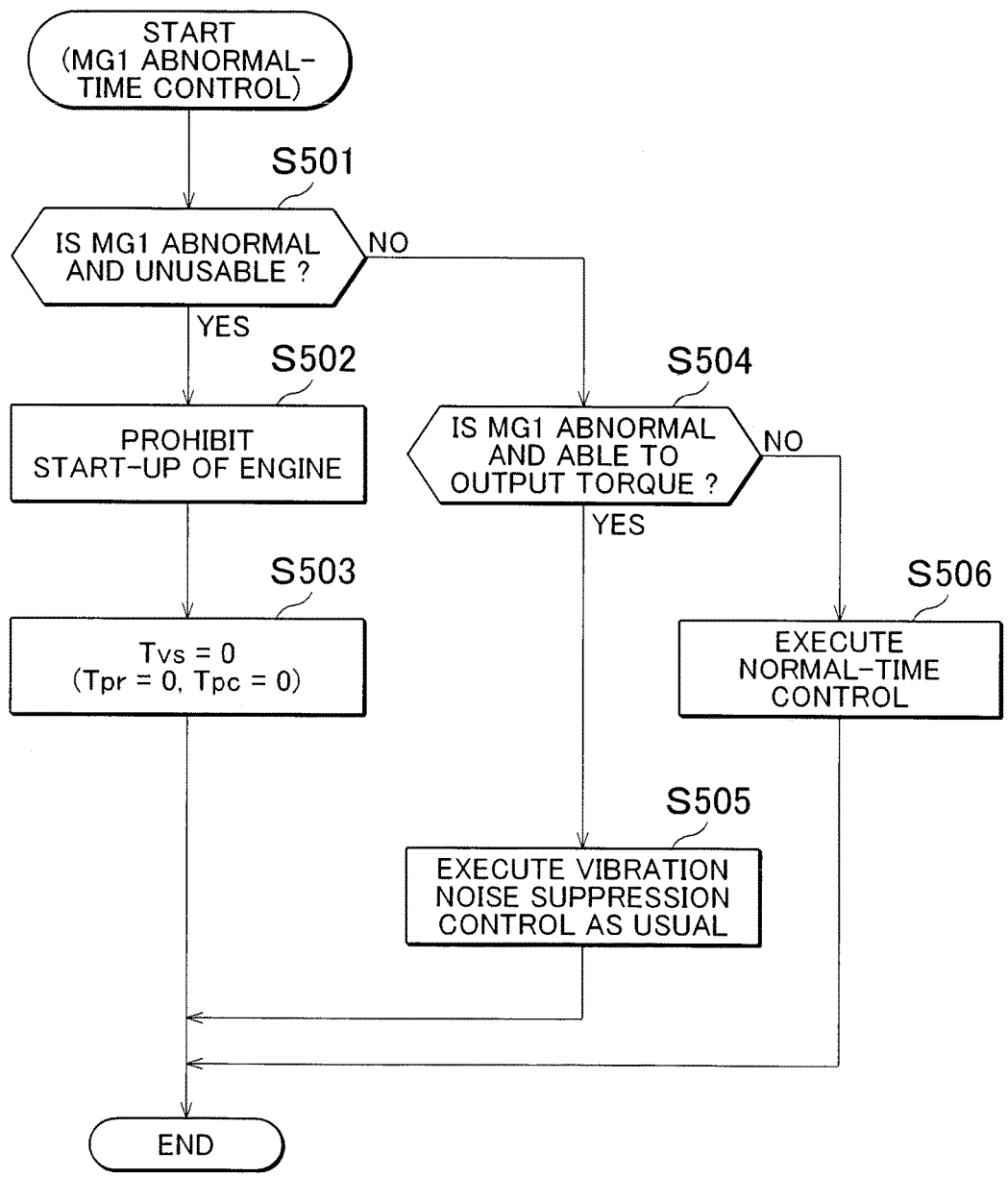
FIG. 20 is a flowchart of MG1 abnormal-time control according to the sixth embodiment of the invention.

Next, MG1 abnormal-time control that is executed in the case where the motor generator MG1 is in an abnormal state will be described with reference to FIG. 20. FIG. 20 is a flowchart of MG1 abnormal-time control.

As shown in FIG. 20, the ECU 100 references the diagnosed result of an abnormality diagnosis process that is executed separately, and determines whether the motor generator MG1 is in the abnormal state and unusable (step S501). The "unusable" means that output of practically significant torque is impossible.

When the motor generator MG1 is in the abnormal state and unusable (YES in step S501), the ECU 100 prohibits start-up of the engine EG (step S502). Here, the term "prohibit" is used; however, in the configuration that couples the engine to the drive shaft DS via the differential mechanism as in the case of the present embodiment, unless reaction torque is supplied to the reaction element (the sun gear S1 in the present embodiment) of the differential mechanism, it is not possible to apply the engine torque Te (accurately, the direct torque Tep) to the drive shaft DS. With such a vehicle configuration, in most cases, cranking torque that is supplied to the engine EG is also provided by the motor generator MG1. Thus, when the motor generator MG1 is in the abnormal state and unusable, it is originally not possible to start up the engine EG.

When start-up of the engine EG is prohibited, both the pressing torque Tpr and the pulsation compensation torque Tpc are set to zero, and suppression of vibration noise by using the damping torque Tvs is stopped (step S503).

The torque pulsation of the crankshaft itself arises as long as the crankshaft is rotating irrespective of whether there is explosion in the engine EG. However, torque pulsation in the case where the engine EG that is a vibration source is not started up is not so large as torque pulsation during operation of the engine EG. Thus, there is practically no large inconvenience even when vibration noise is not suppressed. In a situation that the engine EG cannot be used as the power source, the power source of the hybrid vehicle 1 is substantially only the motor generator MG2. Thus, because of the reason that continuing fail-safe traveling as much as possible is given a higher priority, it is desirable that the output of the damping torque Tvs that accompanies extra electric power consumption is prohibited.

On the other hand, when the motor generator MG1 is not in the abnormal state or not unusable even in the abnormal state (NO in step S501), the ECU 100 further determines whether the motor generator MG1 is in the abnormal state and is able to output torque (step S504). When the motor generator MG1 is not in the abnormal state (NO in step S504), the ECU 100 allows executing normal-time control (step S506). The normal-time control means that the motor generator MG1 is used as the reaction element (simply, as a generator) that takes charge of providing reaction torque for the engine torque Te.

When the motor generator MG1 is in the abnormal state and is able to output torque (YES in step S504), the ECU 100 executes vibration noise suppression control as usual (step S505).

In this way, with the MG1 abnormal-time control, in a configuration that is able to carry out abnormality diagnosis of the motor generator MG1, it is possible to effectively utilize the diagnosed result associated with the abnormality diagnosis in the vibration noise suppression control.

The above-described various embodiments all are predicated on the hybrid vehicle 1. However, a "hybrid vehicle" according to the invention is not necessarily limited to a vehicle in which a drive system is coupled via a differential mechanism, as in the case of the hybrid vehicle 1. For example, a simple one-motor-type vehicle in which an engine and a motor are directly coupled to a drive shaft is also included in the concept of the hybrid vehicle according to the invention. That is, all vehicles having such a configuration that torque pulsation that arises in a crankshaft of an engine appears as torque pulsation of a drive shaft and the torque pulsation of the drive shaft can be suppressed through control over torque of an electric motor are included within the scope of the concept of the "hybrid vehicle" according to the invention.

The above-described various embodiments all assume the motor generator MG2 as an "electric motor" according to the invention. However, even when torque pulsation of the crankshaft itself is suppressed through control over the torque of the motor generator MG1, it is possible to suppress torque pulsation of the drive shaft DS eventually.

The invention is not limited to the above-described embodiments, and may be modified as needed without departing from the scope or idea of the invention, which can be read from the appended claims and the whole specification. A controller for a hybrid vehicle with such modifications is also included in the technical scope of the invention.

The invention claimed is:

1. A controller for a hybrid vehicle, the hybrid vehicle including an internal combustion engine and an electric motor, the internal combustion engine being configured to input a torque to a drive shaft or output a torque from the drive shaft, the electric motor being configured to input a torque to the drive shaft or output a torque from the drive shaft, the controller comprising:
an electronic control unit configured to
a) control the electric motor such that a pulsation compensation torque is supplied to the drive shaft as damping torque for suppressing vibrations of the hybrid vehicle, the pulsation compensation torque being a torque corresponding to a pulsation component of an engine output torque of the internal combustion engine, the pulsation component of the engine output torque appearing in the drive shaft,
b) determine whether or not a torque command value excluding the pulsation compensation torque of the electric motor is smaller than a predetermined value, and
c) control the electric motor such that, when the torque command value excluding the pulsation compensation torque is smaller than the predetermined value, a sum of the pulsation compensation torque and a pressing torque corresponding to the predetermined value is supplied to the drive shaft as damping torque.

2. The controller according to claim 1, wherein the predetermined value is at least larger than or equal to a value of torque that is required to fill looseness in a torque transmission path between the electric motor and the drive shaft.

3. The controller according to claim 1, wherein the predetermined value is larger than or equal to a value of a torque that is required to fill looseness in a torque transmission path between the electric motor and the drive shaft, and
the predetermined value is a value at which a change in an acceleration of the hybrid vehicle falls within a predetermined range.

4. The controller according to claim 1, wherein the electronic control unit is configured to adjust a gain of the pulsation compensation torque such that the pulsation compensation torque decreases as an engine rotation speed of the internal combustion engine increases.

5. The controller according to claim 1, wherein the electronic control unit is configured to adjust a gain of the pulsation compensation torque such that the pulsation compensation torque decreases as the engine output torque decreases.

6. The controller according to claim 1, wherein the pulsation compensation torque is a torque different in phase by 180 degrees from a pulsation torque of the drive shaft.

* * * * *